United States Patent
Jiang et al.

(10) Patent No.: US 7,820,336 B2
(45) Date of Patent: Oct. 26, 2010

(54) FUEL CELL BIPOLAR PLATE, AND FUEL CELL

(75) Inventors: Jianye Jiang, Takaishi (JP); Tetsuya Harada, Takaishi (JP)

(73) Assignee: DIC Corporation, Tokyo (JP)

( * ) Notice: Subject to any disclaimer, the term of this patent is extended or adjusted under 35 U.S.C. 154(b) by 6 days.

(21) Appl. No.: 12/444,262

(22) PCT Filed: Sep. 27, 2007

(86) PCT No.: PCT/JP2007/068778

§ 371 (c)(1),
(2), (4) Date: Apr. 3, 2009

(87) PCT Pub. No.: WO2008/044472

PCT Pub. Date: Apr. 17, 2008

(65) Prior Publication Data

US 2010/0015502 A1    Jan. 21, 2010

(30) Foreign Application Priority Data

Oct. 5, 2006    (JP) ............................. 2006-273998

(51) Int. Cl.
*H01M 2/38* (2006.01)
*H01M 2/40* (2006.01)
*H01M 8/24* (2006.01)

(52) U.S. Cl. .................. 429/457; 429/452; 429/456
(58) Field of Classification Search .................. 429/34, 429/38, 39
See application file for complete search history.

(56) References Cited

U.S. PATENT DOCUMENTS 4,755,429 A * 7/1988 Nickols et al. .............. 428/408
6,884,536 B1 * 4/2005 Hatoh et al. ................. 429/34
7,029,784 B2 * 4/2006 Carlstrom .................... 429/38
2002/0004082 A1   1/2002 Saito et al.
2003/0224239 A1 * 12/2003 Carlstrom .................... 429/38
2004/0048126 A1   3/2004 Shibata et al.
2004/0131918 A1   7/2004 Ohara et al.

FOREIGN PATENT DOCUMENTS

| JP | 2001-198921 A | 7/2001 |
| JP | 2003-170459 A | 6/2003 |
| JP | 2004-39365 A  | 2/2004 |

(Continued)

OTHER PUBLICATIONS

International Search Report for PCT/JP2007/068778 with a mailing date of Jan. 8, 2008.

(Continued)

*Primary Examiner*—Patrick Ryan
*Assistant Examiner*—Julian Mercado
(74) *Attorney, Agent, or Firm*—Westerman, Hattori, Daniels & Adrian, LLP

(57) ABSTRACT

A fuel cell bipolar plate has a front surface and a rear surface opposite to each other, and flash and a receding portion. The flash is provided on the front surface at an outer peripheral portion of the bipolar plate and projects in a direction crossing the front surface. The receding portion is provided on the rear surface at an outer peripheral portion of the bipolar plate in a geometry capable of accommodating flash.

9 Claims, 19 Drawing Sheets

FOREIGN PATENT DOCUMENTS

| | | |
|---|---|---|
| JP | 2004-71334 A | 3/2004 |
| JP | 2004-139788 A | 5/2004 |
| JP | 2004-230788 A | 8/2004 |
| JP | 2004-235137 A | 8/2004 |
| JP | 2005-522829 A | 7/2005 |
| JP | 2005-216854 A | 8/2005 |
| JP | 3751911 B2 | 3/2006 |
| JP | 2007-305459 A | 11/2007 |
| WO | 03/086749 A1 | 10/2003 |

OTHER PUBLICATIONS

Decision To Grant Patent for Japanese Patent Application No. 2008-506837, mailed on Oct. 28, 2008.

* cited by examiner

R > r

R>r

COOLANT →

COOLANT →

FUEL CELL BIPOLAR PLATE, AND FUEL CELL

TECHNICAL FIELD

The present invention relates to fuel cell bipolar plates, and the fuel cells.

BACKGROUND ART

In recent years, fuel cells obtaining electric power from an electrochemical reaction of hydrogen and oxygen are studied for a variety of applications such as portable equipment, automobiles and the like. A fuel cell has a structure normally formed of several tens to several hundreds of unit cells stacked in layers in series. A unit cell is a basic configuration unit formed of electrolyte membrane, an electrode and a bipolar plate. Generally, a fuel cell is fabricated in a method, as follows: The electrolyte membrane and the electrode are previously formed as a membrane electrode assembly (MEA) and thereat the bipolar plate is disposed. The bipolar plate has channels formed at least one surface thereof for supplying hydrogen or a similar fuel, an oxidant formed of air or oxygen, and a coolant cooling the cells, respectively.

The bipolar plate is required to have sufficient conductivity to ensure electrical connection to an MEA adjacent thereto to allow the fuel cell to generate electric power more efficiently, and in addition thereto, it is also required to have sufficient mechanical strength to support the structure formed of unit cells stacked in layers. Furthermore, as there is a demand for fuel cells reduced in size, there is also a demand for bipolar plates reduced in thickness. Furthermore, there is also a demand for higher precision in thickness in order to reduce contact resistance between the unit cells stacked in layers.

Conventional fuel cell bipolar plates are formed of a material including resin and a carbon material, and introduced into a compression mold and pressurized and thus molded. Such fuel cell bipolar plates are formed in molds having a variety of structures, as conventionally proposed (see patent documents 1-5 for example.).

The compression mold is required to be capable of (1) exhausting efficiently and externally the air present in the mold and that present in the material molded and (2) discharging from the mold externally the material to be molded that is excessively introduced into the mold.

Generally, conventional compression molds are configured of a recessed mold half 101 having a recess (a cavity) 101a, and a projected mold half 102 having a projection (a core) 102a, as shown in FIG. 24A, and furthermore, to satisfy items (1), (2) above, recess 101a and projection 102a have sidewalls, respectively, opposite to each other to provide a share edge (a region P in the figure).

When such a mold is employed to mold a material to be molded 120a, the material that is excessive flows out of recess 101a and is discharged into a gap (or clearance) of the share edge and the mold and the material can also have their internal air exhausted out of the mold efficiently.

Furthermore, there is also a mold, as shown in FIG. 25A, which is a joined-type compression mold configured of mold half 101 having recess 101a and mold half 102 having recess 102a. This type of mold is simple in structure and can also be reduced in thickness in total.

Patent Document 1: Japanese Patent Laying-open No. 2001-198921

Patent Document 2: Japanese Patent Laying-open No. 2003-170459

Patent Document 3: Japanese Patent Laying-open No. 2004-230788

Patent Document 4: Japanese Patent Laying-open No. 2004-71334

Patent Document 5: Japanese Patent No. 3751911

DISCLOSURE OF THE INVENTION

Problems to be Solved by the Invention

The compression mold having the FIG. 24A conventional share edge structure, however, provides a molded product 120 having resin flash in a direction crossing one surface 120A, as shown in FIG. 24B. Furthermore, the FIG. 25A conventional, joined-type compression mold provides molded product 120 having resin flash in a direction generally parallel to one surface 120A, as shown in FIG. 25B.

When a fuel cell has a plurality of bipolar plates (or molded products) stacked on one another, it is necessary to dispose the molded products in sufficient contact with or sufficiently adjacent to one another. If molded product 120 has resin flash in a direction crossing one surface 120A, as shown in FIG. 24B, however, molded products 120 cannot be disposed in sufficient contact with or sufficiently adjacent to one another.

Furthermore, when the plurality of bipolar plates (or molded products) are stacked on one another, they are positioned with a level of precision, which is determined by the molded product's peripheral geometry. If molded product 120 has resin flash in a direction generally parallel to one surface 120A, as shown in FIG. 25B, however, molded products 120 are positioned with poor precision and thus cannot be stacked on one another with high precision.

Furthermore, the molded product has such resin flash as above not only at an outer peripheral portion thereof but also in the plane of the molded product at a through hole or the like, and the resin flash formed at the through hole prevents the molded products from being brought into sufficient contact with or sufficiently adjacent to one another.

Furthermore, removing such resin flash requires a complicated deflashing step.

The present invention has been made in view of such disadvantages as described above, and it contemplates a fuel cell bipolar plates and the fuel cell, that allow molded products to be disposed in sufficient contact with or sufficiently adjacent to one another and also positioned with satisfactory precision and thus stacked on one another and can also dispense with a complicated deflashing step.

Means for Solving the Problems

The present invention provides one fuel cell bipolar plate, having one surface having flash projecting from an outer peripheral portion in a direction crossing one surface, and the other surface having a receding portion formed at an outer peripheral portion, and having a geometry capable of accommodating the flash.

The present invention provides one fuel cell bipolar plate, that has a receding portion formed to be capable of accommodating flash. When bipolar plates identical in geometry are stacked on one another, the flash caused at one surface of one bipolar plate is accommodated in a receding portion formed in the other surface of the other bipolar plate. The bipolar plates can thus be disposed in sufficient contact with or sufficiently adjacent to each other.

Furthermore, the flash projects in a direction crossing one surface of the bipolar plate and does not project from a side surface of the bipolar plate toward the outer periphery of the bipolar plate. The bipolar plates can thus be positioned with satisfactory precision and thus stacked on one another.

Furthermore, it is no longer necessary to remove the flash, and a complicated deflashing step can be dispensed with.

The present invention provides another fuel cell bipolar plate, having a channel and a manifold that is unconnected to the channel. The bipolar plate has one surface having flash projecting from a peripheral portion of the manifold that is unconnected to the channel in a direction crossing one surface. The bipolar plate has the other surface having a receding portion that is formed at a peripheral portion of the manifold unconnected to the channel and has a geometry capable of accommodating the flash.

In accordance with the present invention's another fuel cell bipolar plate, when bipolar plates identical in geometry are stacked on one another, the flash caused at a peripheral portion of a manifold of one bipolar plate can be accommodated in a receding portion of the other bipolar plate. The bipolar plates can thus be disposed in sufficient contact with or sufficiently adjacent to each other.

The above described one and other bipolar plates preferably have the receding portion forming a step.

The present invention provides one fuel cell comprising: the above described one or other bipolar plate provided for the fuel cell and another such bipolar plate paired therewith; and a membrane electrode assembly for being stacked alternately with the pair of bipolar plates, wherein one bipolar plate of the pair of the bipolar plates has the flash accommodated in the receding portion of the other bipolar plate of the pair of the bipolar plates.

One fuel cell of the present invention allows one fuel cell bipolar plate to have flash accommodated in a receding portion of the other fuel cell bipolar plate. The bipolar plates can be in sufficient contact with each another.

The present invention provides another fuel cell comprising: the above described one or other fuel cell bipolar plate; and a membrane electrode assembly for being stacked alternately with the bipolar plate, wherein one bipolar plate has the flash accommodated in the receding portion of the other bipolar plate opposite to one bipolar plate with the membrane electrode assembly interposed.

The present invention provides the other fuel cell that allows one bipolar plate to have flash accommodated in a receding portion of the other bipolar plate opposite with a membrane electrode assembly interposed. The bipolar plates can be disposed sufficiently adjacently.

The present invention provides still another fuel cell bipolar plate, having a channel and a manifold connected to the channel. The manifold is connected to the channel at one surface of a fuel cell bipolar plate and unconnected to the channel at the other surface. One surface does not have flash at a connection between the channel and the manifold and the other surface has a receding portion at a peripheral portion of the manifold. The receding portion has a recess, and flash that is provided in the recess, and projects from a bottom surface of the recess and does not project from the other surface.

Still another fuel cell bipolar plate in accordance with the present invention has a recess having a bottom surface having flash in the recess. The flash in the recess can have a tip within the recess and thus be prevented from projecting from a second surface of a second bipolar plate toward a first bipolar plate. Furthermore, the recess can also accommodate flash of the first bipolar plate.

Furthermore, one surface at a portion having a channel and a manifold connected to each other does not have flash, and a flow of gas is not prevented between the cannel and the manifold.

Furthermore, the receding portion is formed in a geometry that can accommodate flash. As such, when a bipolar plate having flash at a peripheral portion of a manifold and the bipolar plate of the present invention are stacked on each other, the flash caused at a peripheral portion of a manifold of one bipolar plate is accommodated in a receding portion of a peripheral portion of a manifold of the other bipolar plate. The bipolar plates can thus be disposed in sufficient contact with or sufficiently adjacent to each other.

Furthermore, it is no longer necessary to remove the flash, and a complicated deflashing step can be dispensed with.

The present invention provides still another fuel cell comprising: a pair of fuel cell bipolar plates, consisting of one bipolar plate and the other bipolar plate being opposite to each other, one bipolar plate having one surface having flash projecting from an outer peripheral portion of one surface in a direction crossing one surface, the other bipolar plate having the other surface having a receding portion formed at an outer peripheral portion of the other surface, and having a geometry capable of accommodating the flash; and a membrane electrode assembly for being stacked alternately with the pair of bipolar plates. The bipolar plate having the flash has the flash accommodated in the receding portion of the bipolar plate having the receding portion.

Still another fuel cell of the present invention allows one bipolar plate's flash to be accommodated in another bipolar plate's receding portion. The bipolar plates can thus be in sufficient contact with each another.

The present invention provides still another fuel cell, having one surface and the other surface opposite to each other, and having an outer peripheral portion having a portion tapered to reduce a bipolar plate in width in a direction from a side of one surface toward a side of the other surface.

Still another fuel cell bipolar plate in accordance with the present invention has an outer peripheral portion having a tapered portion. The tapered portion can accommodate flash therein. When the bipolar plate having the tapered portion and that having flash are stacked on each other, the tapered portion can accommodate the flash therein, and the bipolar plates can be disposed in sufficient contact with or sufficiently adjacent to each another.

Effects of the Invention

Thus in accordance with the present invention a receding portion that can accommodate flash is provided to a fuel cell bipolar plate. A fuel cell bipolar plate and the fuel cell can be provided that allow molded products to be disposed in sufficient contact with or sufficiently adjacent to one another and also positioned with satisfactory precision and thus stacked on one another and can also dispense with a complicated deflashing process.

DESCRIPTION OF THE REFERENCE SIGNS

1, 1P, 1Q: fuel cell bipolar plate, 2$a$, 2$b$, 2$a_1$, 2$a_2$, 2$b_1$, 2$b_2$: hole for manifold, 3: channel, 4, 4$a$, 4$b$: flash, 5$a$, 5$b$, 5$c$, 5$d$: receding portion, 6: recess, 10: mold, 11, 12: mold member, 21: solid polymer electrolyte membrane, 22: electrode (fuel electrode, oxidant electrode).

BEST MODES FOR CARRYING OUT THE INVENTION

Hereinafter the present invention in embodiments will be described with reference to the drawings.

First Embodiment

Figure 1:
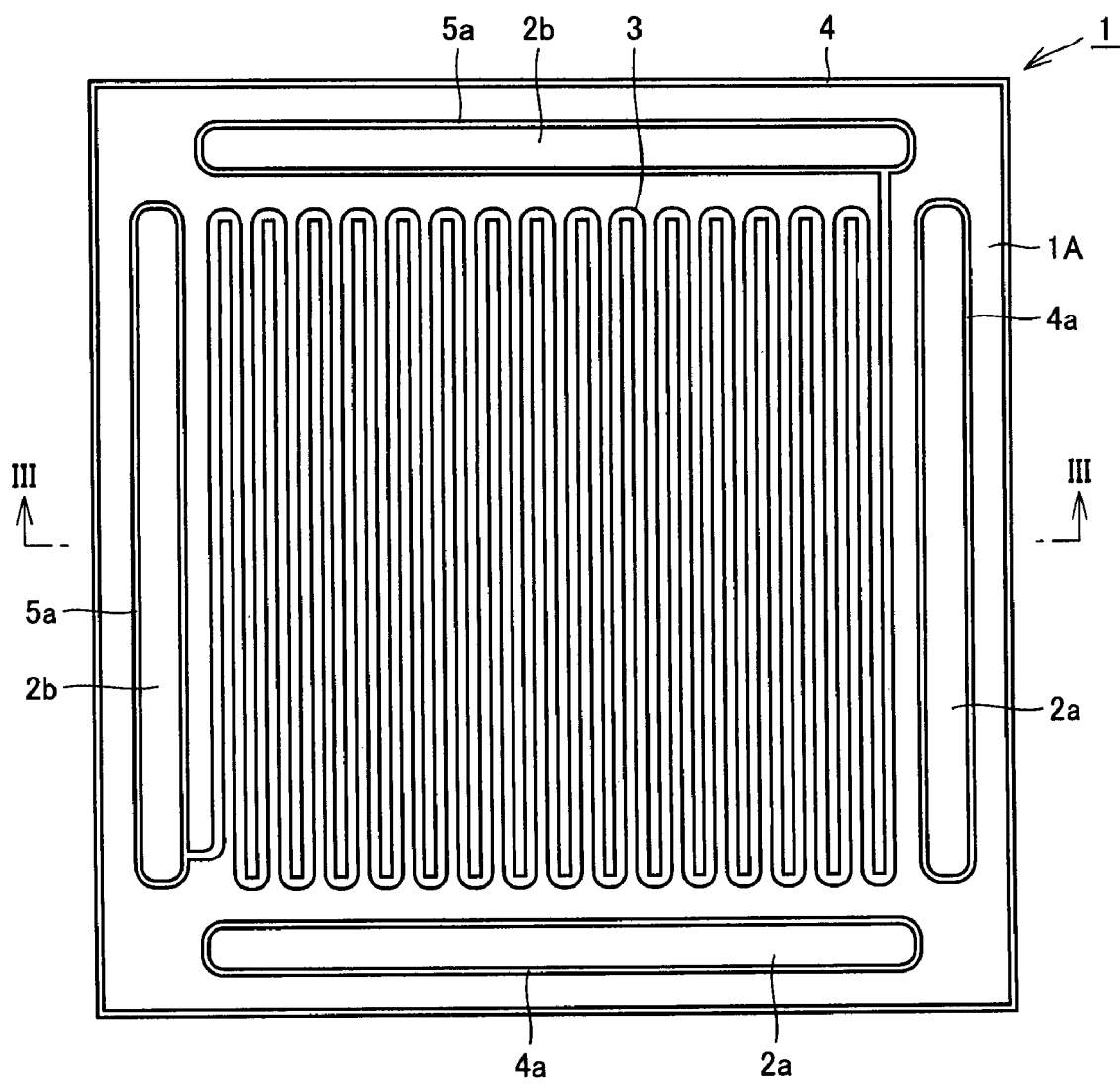
FIG. 1 is a plan view schematically showing a configuration of a fuel cell bipolar plate in a first embodiment of the present invention.
Figure 2:
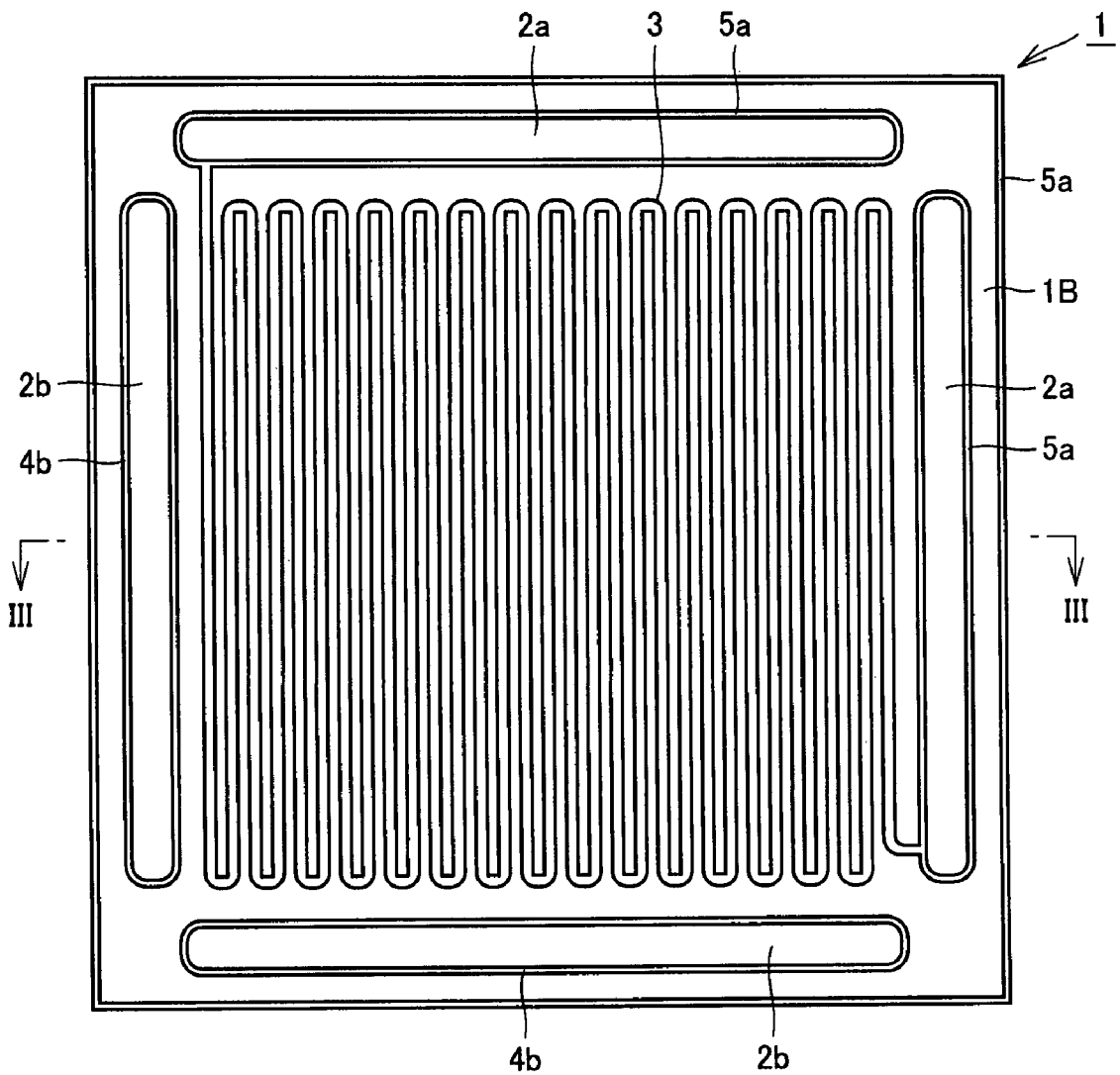
FIG. 2 is a rear view schematically showing the configuration of the fuel cell bipolar plate in the first embodiment of the present invention.
Figure 3:
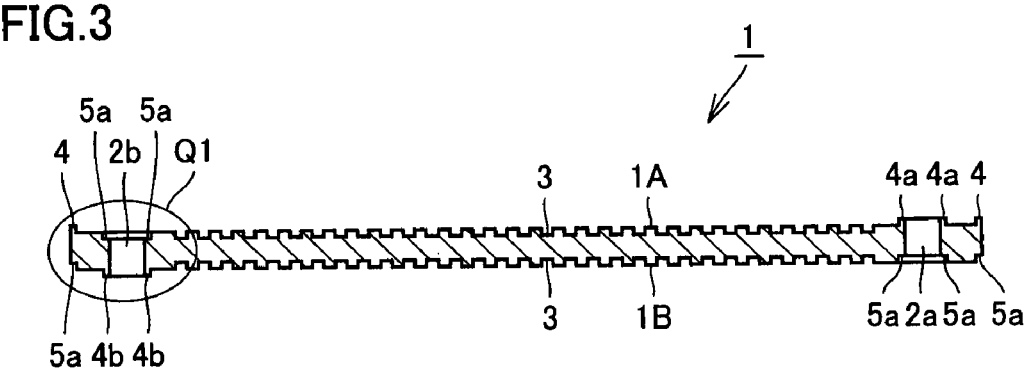
FIG. 3 is a schematic cross section taken along a line III-III shown in FIG. 1 and FIG. 2.
Figure 4:
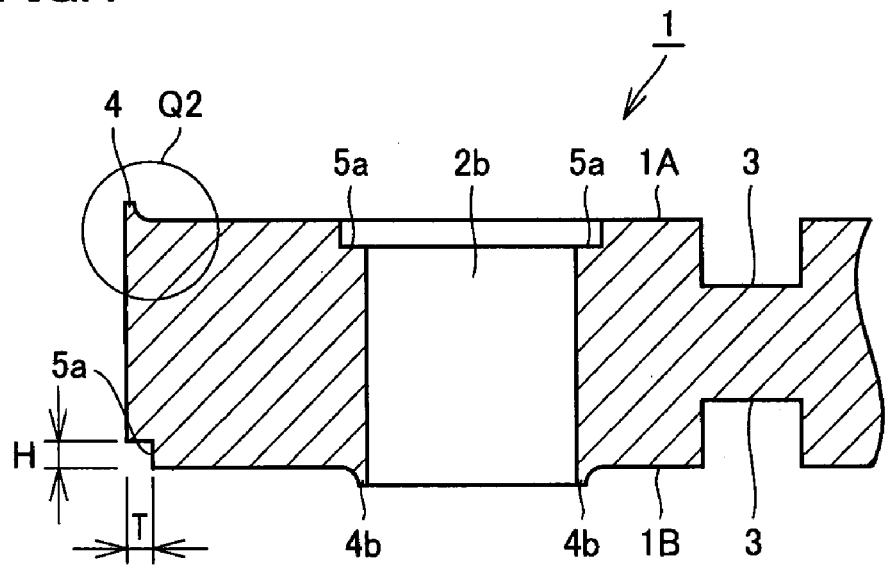
FIG. 4 is a schematic, enlarged cross section of a region Q1 shown in FIG. 3.
Figure 5:
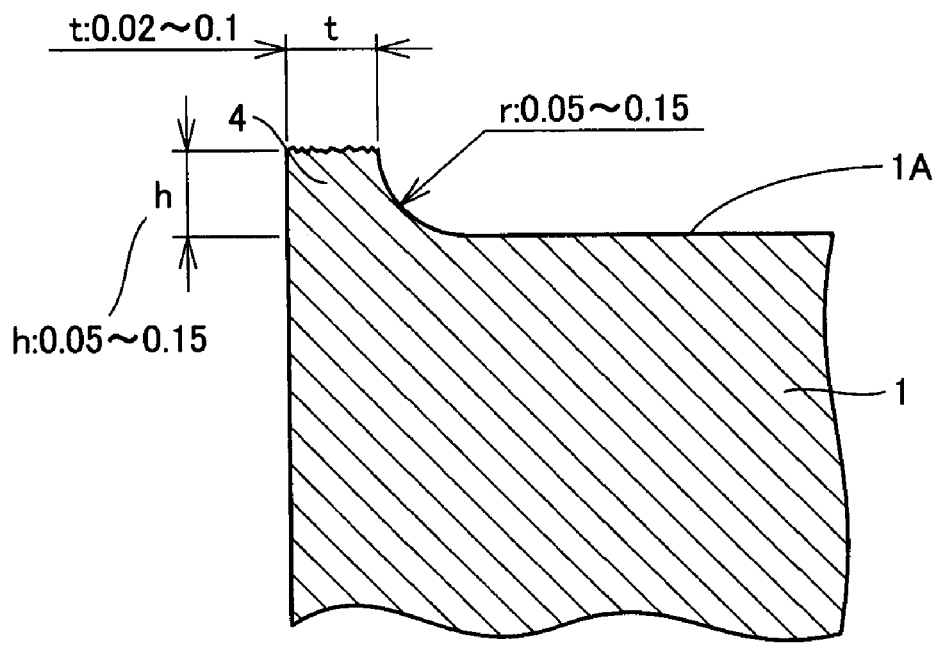
FIG. 5 is a schematic, enlarged cross section of flash of a region Q2 shown in FIG. 4.

FIG. 1 and FIG. 2 are a plan view and a rear view, respectively, schematically showing a configuration of a fuel cell bipolar plate in a first embodiment of the present invention. FIG. 3 is a schematic cross section taken along a line III-III shown in FIG. 1 and FIG. 2. FIG. 4 is a schematic, enlarged cross section of a region Q1 shown in FIG. 3. FIG. 5 is a schematic, enlarged cross section of flash of a region Q2 shown in FIG. 4.

With reference to FIG. 1 to FIG. 3, a fuel cell bipolar plate 1 has a rectangular, planar geometry and has one surface 1A and the other surface 1B opposite to each other. Bipolar plate 1 has holes 2$a$, 2$b$ for manifolds penetrating between one surface 1A and the other surface 1B. Furthermore, one surface 1A and the other surface 1B each have a channel 3 formed in communication with holes 2$a$, 2$b$ for gas or the like.

One surface 1A at an outer peripheral portion of bipolar plate 1 and at a peripheral portion of hole 2$a$ has flash 4, 4$a$ projecting in a direction crossing one surface 1A. Furthermore, the other surface 1B at an outer peripheral portion of bipolar plate 1 and at a peripheral portion of hole 2$a$ has a receding portion 5$a$ formed to have a geometry that can accommodate each flash 4, 4$a$.

Furthermore, the other surface 1B at a peripheral portion of hole 2$b$ has flash 4$b$ projecting in a direction crossing the other surface 1B. Furthermore, one surface 1A at a peripheral portion of hole 2$b$ has receding portion 5$a$ formed to have a geometry that can accommodate flash 4$b$.

Each of flash 4, 4$a$, 4$b$ may exist along the entire outer periphery of bipolar plate 1 and the entire periphery of each of holes 2$a$, 2$b$, or may have a portion interrupted. Furthermore, preferably, receding portion 5$a$ is provided along the entire outer periphery of bipolar plate 1 and the entire periphery of each of holes 2$a$, 2$b$. However, receding portion 5$a$ may have a portion interrupted.

Hole 2$a$ for a manifold is connected to channel 3 at the other surface 1B, and hole 2$b$ for a manifold is connected to channel 3 at one surface 1A. Holes 2a, 2b have their respective peripheral portions with flash 4a, 4b each at a surface opposite to that having hole 2a, 2b connected to channel 3. Flash 4a, 4b is thus not located between holes 2a, 2b and channel 3 and thus does not prevent a fluid from flowing between the channel and the holes.

Figure 26:
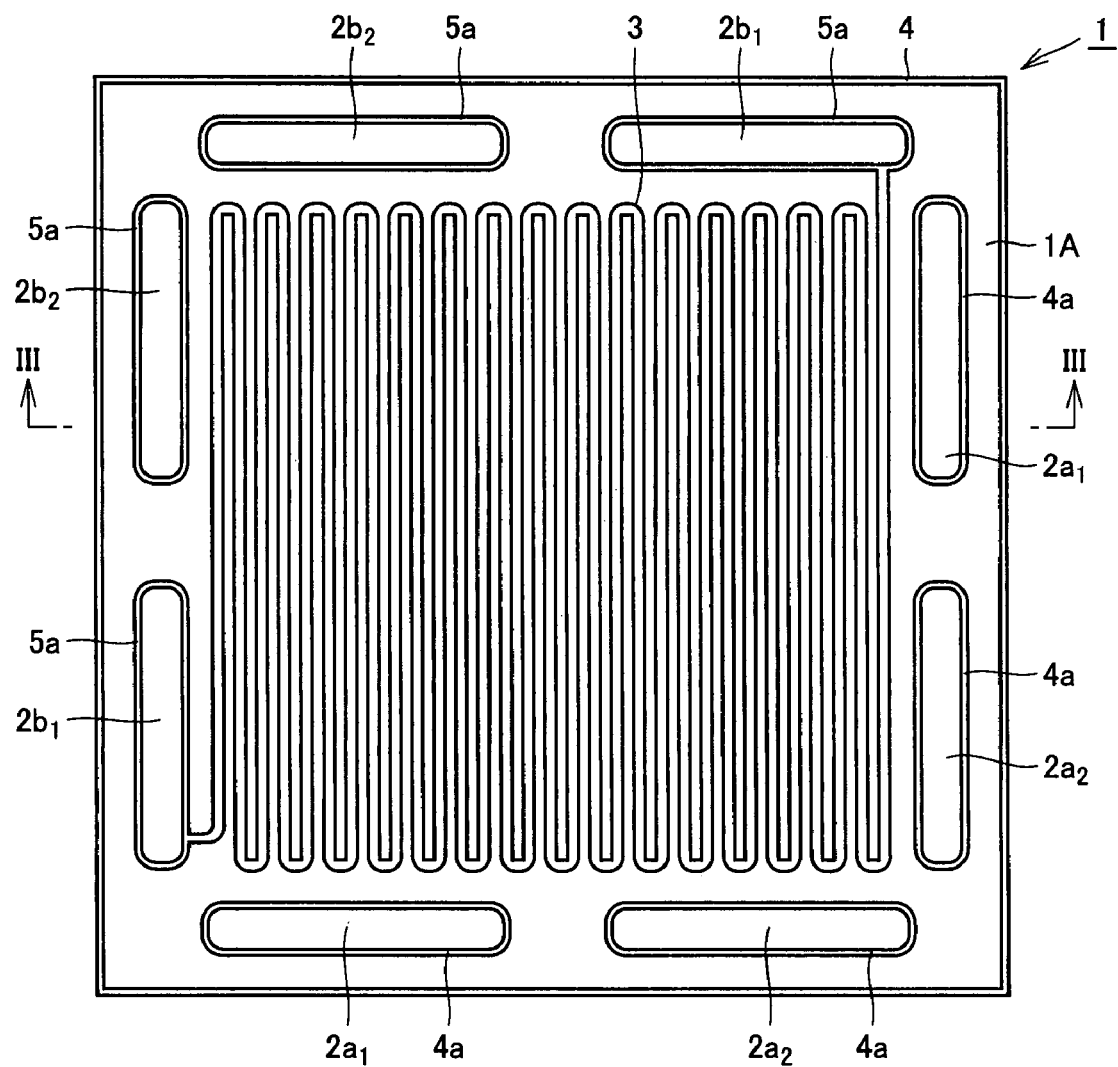
FIG. 26 is a plan view schematically showing a configuration of a fuel cell bipolar plate, that has a manifold unconnected to a channel.
Figure 27:
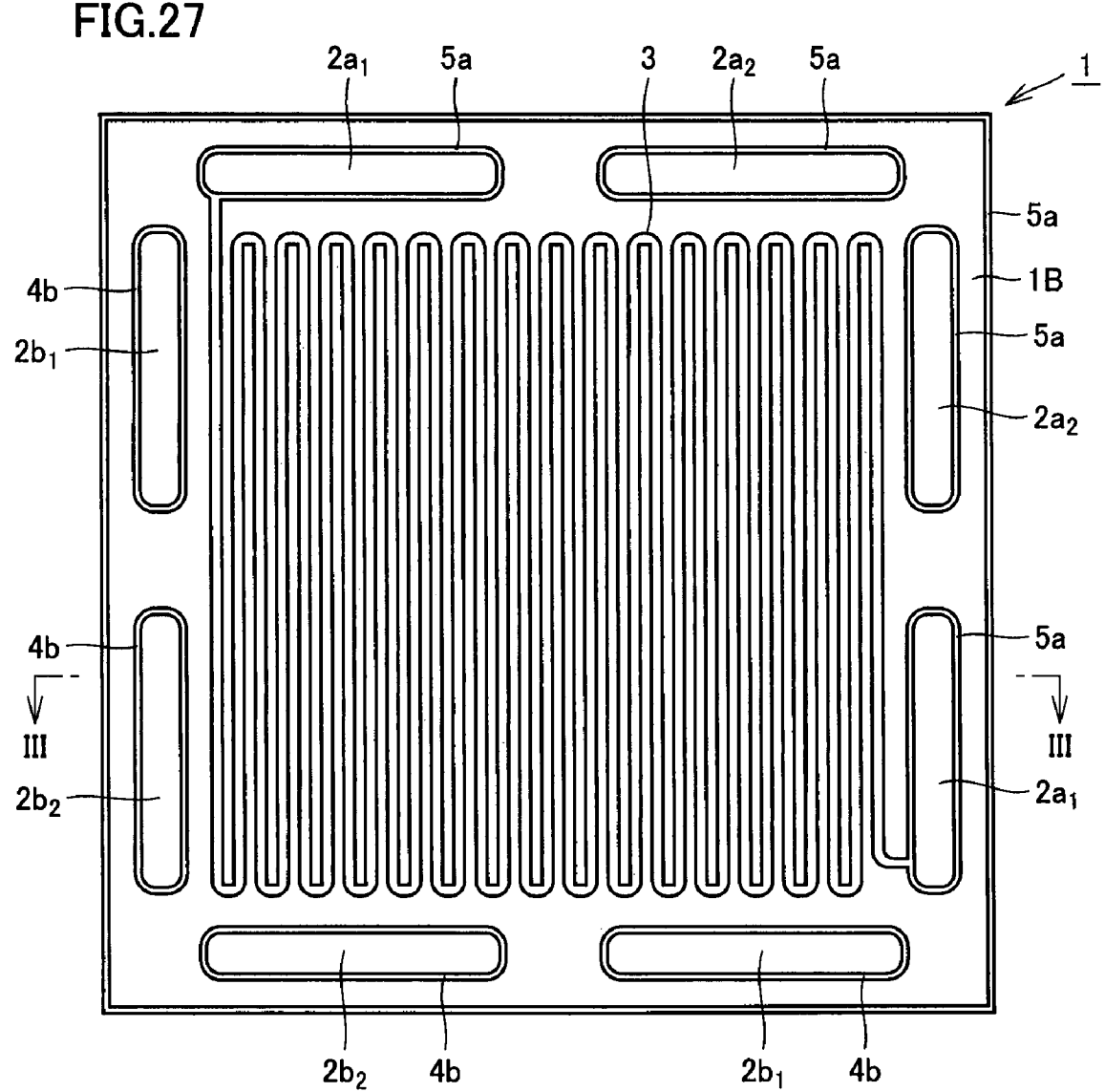
FIG. 27 is a rear view schematically showing the configuration of the fuel cell bipolar plate, that has the manifold unconnected to the channel.

Furthermore, although not shown in FIG. 1 and FIG. 2, fuel cell bipolar plate 1 may have a hole for a manifold unconnected to channel 3. FIG. 26 and FIG. 27 are a plan view and a rear view, respectively, schematically showing a configuration of a fuel cell bipolar plate, that has a manifold unconnected to a channel. With reference to FIG. 26 and FIG. 27, fuel cell bipolar plate 1 has holes $2a_1$, $2b_1$ for manifolds that are connected to channel 3, and in addition thereto holes $2a_2$, $2b_2$ for manifolds that are unconnected to channel 3.

Hole $2a_2$ for a manifold unconnected to channel 3 has at one surface 1A a peripheral portion having flash 4a projecting in a direction crossing one surface 1A. Furthermore, hole $2a_2$ for the manifold unconnected to channel 3 has at the other surface 1B a peripheral portion having receding portion 5a having a geometry that can accommodate flash 4a.

Furthermore, hole $2b_2$ for a manifold unconnected to channel 3 has at the other surface 1B a peripheral portion having flash 4b projecting in a direction crossing the other surface 1B. Furthermore, hole $2b_2$ for the manifold unconnected to channel 3 has at one surface 1A a peripheral portion having receding portion 5a having a geometry that can accommodate flash 4b.

Furthermore, holes $2a_1$, $2b_1$, for manifolds connected to channel 3, flash 4a, 4b formed at the holes' respective peripheral portions, and receding portion 5a are substantially identical in configuration to the FIG. 1 and FIG. 2 holes 2a, 2b for manifolds, flash 4a, 4b, and receding portion 5a. Furthermore, a configuration in a cross section taken along a line III-III shown in FIG. 26 and FIG. 27 is substantially identical to that shown in FIG. 3.

Furthermore, except for the above, the FIG. 26 and FIG. 27 bipolar plate 1 is substantially identical in configuration to that shown in FIG. 1 to FIG. 3. Accordingly, identical components are denoted by identical reference characters and will not be described repeatedly.

With reference to FIG. 4, receding portion 5a is configured by cutting off a corner of bipolar plate 1 to form a step in cross section. More specifically, with reference to FIG. 1 and FIG. 2, fuel cell bipolar plate 1 has an outer peripheral portion having receding portion 5a having a geometry defined by a side surface of bipolar plate 1 and the other surface 1B that have cut off a corner formed by the side surface and the other surface 1B. Furthermore, hole 2a has a peripheral portion having receding portion 5a having a geometry defined by a wall surface of hole 2a and the other surface 1B that have cut off a corner formed by the wall surface and the other surface 1B. Furthermore, hole 2b has a peripheral portion having receding portion 5a having a geometry defined by a wall surface of hole 2b and one surface 1A that have cut off a corner formed by the wall surface and one surface 1A.

With reference to FIG. 5, a boundary of one side surface of flash 4 and one surface 1A of bipolar plate 1 is round, having a radius of curvature r. Flash 4 has the other side surface formed of a surface continuing to the bipolar plate's side surface, Flash 4 has the radius of curvature r of at least 0.05 mm and at most 0.15 mm, a thickness t of at least 0.02 mm and at most 0.1 mm, and a height h of at least 0.05 mm and at most 0.15 mm.

If flash 4 has the radius of curvature r of less than 0.05 mm, it would be difficult to process the mold for molding. If flash 4 has the radius of curvature r exceeding 0.15 mm, flash 4 is excessively large. If flash 4 has thickness t of less than 0.02 mm, it would be difficult to exhaust air present in a material to be molded and the resultant molded product may have voids therein. If flash 4 has thickness t exceeding 0.1 mm, the material to be molded would leak in an increased amount resulting in a molded product unstable in thickness. Flash 4 has height h determined by the magnitude of the radius of curvature r of flash 4 described above. Note that flash 4a, 4b is similar in geometry to flash 4 described above.

Receding portion 5a shown in FIG. 4 is basically only required to have a size that can accommodate flash 4, 4a, 4b. If receding portion 5a has a step, as provided in the present embodiment, receding portion 5a is only required to have the step with a dimension H equal to or larger than height h of flash 4, 4a, 4b (i.e., H≧h), and, as seen in a direction along the other surface 1B of bipolar plate 1, a width T equal to or larger than a sum of thickness t of flash 4, 4a, 4b and the radius of curvature r of flash 4, 4a, 4b (i.e., T≧t+r). Note that preferably dimensions H, T have an upper limit set to be a dimension that does not affect the molded product in geometry, and stability in dimension.

Figure 6:
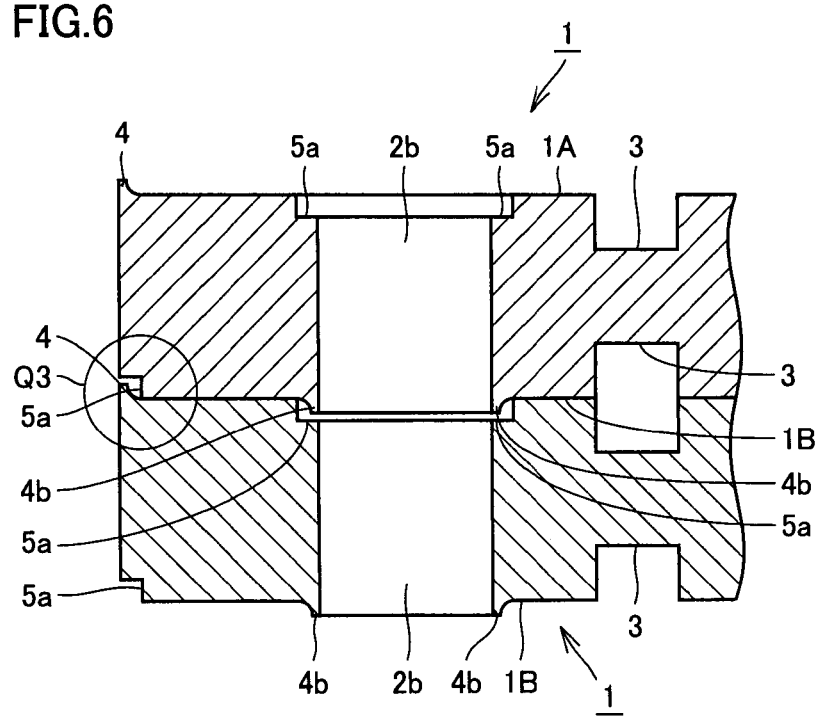
FIG. 6 is a schematic cross section of the FIG. 4 bipolar plate stacked on another such bipolar plate.
Figure 7:
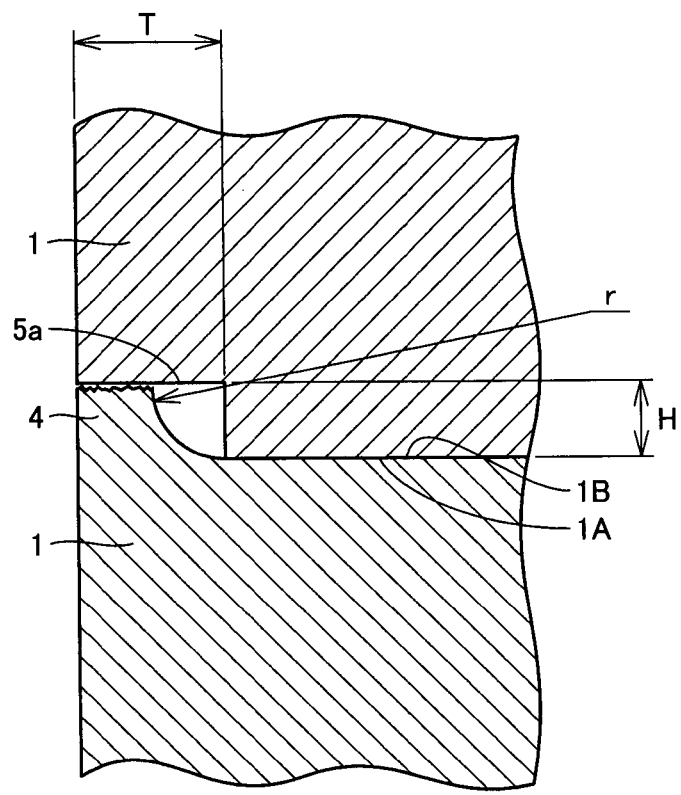
FIG. 7 is a schematic, enlarged cross section of a region Q3 shown in FIG. 6.

FIG. 6 is a schematic cross section of the FIG. 4 bipolar plate stacked on another such bipolar plate. FIG. 7 is a schematic, enlarged cross section of a region Q3 shown in FIG. 6.

If the above described fuel cell bipolar plate 1 is stacked on another such bipolar plate, more than one bipolar plate 1 shown in FIG. 4 is prepared. (For example, two such bipolar plates are prepared.) These bipolar plates 1 are positioned, and thereafter stacked on one another, as shown in FIG. 6. With the bipolar plates thus stacked, receding portion 5a is located at a position corresponding to that having flash 4, 4a, 4b, as has been described above, and as receding portion 5a has a dimension that can accommodate each flash 4, 4a, 4b, flash 4, 4a, 4b is each accommodated in receding portion 5a, as shown in FIG. 6 and FIG. 7.

Hereinafter a mold will be described for producing fuel cell bipolar plate 1 in the present embodiment.

Figure 8:
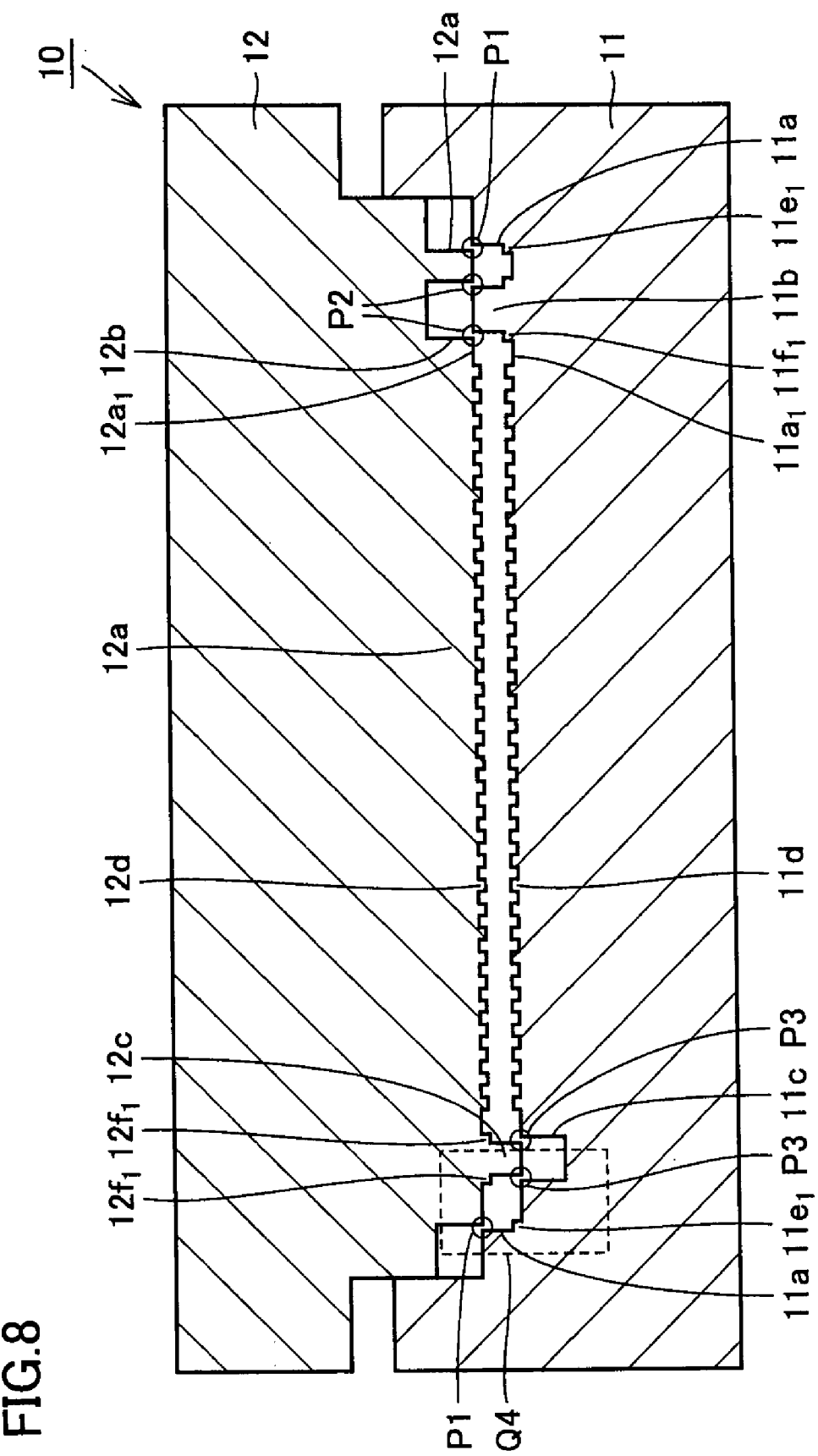
FIG. 8 is a cross section schematically showing a configuration of a mold employed to mold the fuel cell bipolar plate in the first embodiment of the present invention.
Figure 9:
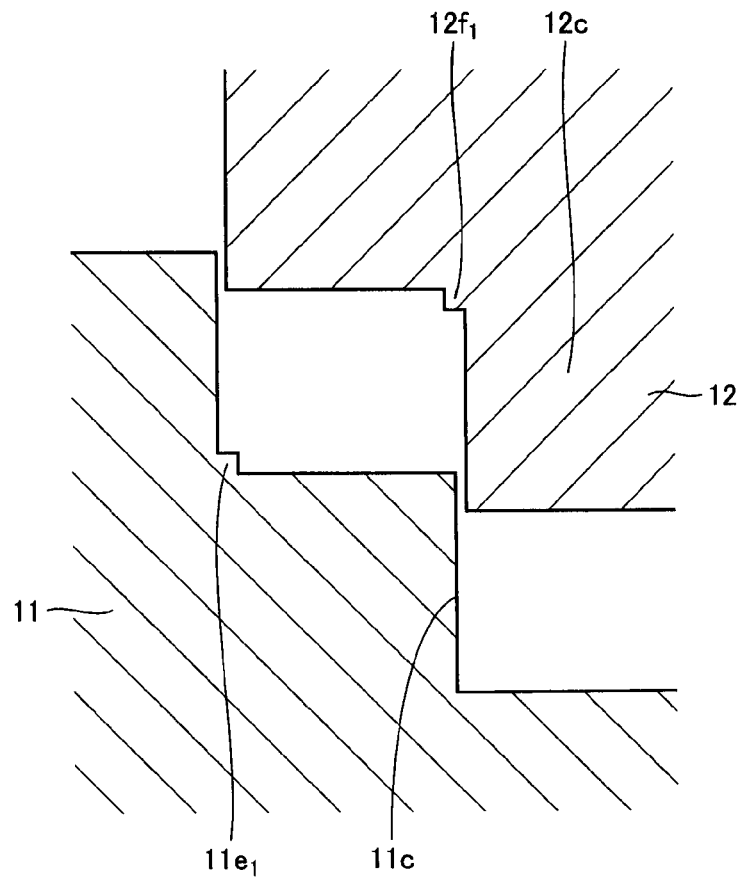
FIG. 9 is a schematic, enlarged cross section of a region Q4 shown in FIG. 8.

FIG. 8 is a cross section schematically showing a configuration of a mold employed to mold the fuel cell bipolar plate in the first embodiment of the present invention. FIG. 9 is a schematic, enlarged cross section of a region Q4 shown in FIG. 8.

With reference to FIG. 8 and FIG. 9, a mold 10 for molding is a mold employed to mold a material to be molded and has a mold member 11 and a mold member 12. Mold member 11 has a surface facing mold member 12 and having a recess 11a. Mold member 12 has a surface facing mold member 11 and having a projection 12a provided to correspond to recess 11a. Recess 11a and projection 12a are configured such that when mold members 11 and 12 are joined together recess 11a of mold member 11 receives projection 12a of mold member 12.

Mold member 11 has recess 11a having a bottom surface $11a_1$ having a channel forming projection 11d for forming a channel for gas or the like, and a hole forming projection 11b and a hole forming recess 11c for forming a hole for a manifold.

Mold member 12 has projection 12a having a top surface $12a_1$ opposite to bottom surface $11a_1$ of recess 11a. Top surface $12a_1$ has a channel forming projection 12d for forming a channel for gas or the like, and a hole forming recess 12b and a hole forming projection 12c for forming a hole for a manifold.

The mold member 11 hole forming projection 11b is provided to correspond to the mold member 12 hole forming recess 12b and the mold member 11 hole forming recess 11c is provided to correspond to the mold member 12 hole forming projection 12c.

Mold member 11 has recess 11a having a peripheral portion surrounded by a receding portion forming projection $11e_1$. Furthermore, hole forming projection 11b has a foot having a peripheral portion surrounded by a receding portion forming projection $11f_1$, and hole forming projection 12c has a foot having a peripheral portion surrounded by a receding portion forming projection $12f_1$. These receding portion forming projections $11e_1$, $11f_1$, $12f_1$ are each for example a pointed step in cross section.

When mold 10 as described above is employed, the present embodiment's fuel cell bipolar plate 1 is produced in a method, as will be described hereinafter.

Initially, a material to be molded is prepared for example to include at least a conductive carbon material and a resin binder. The resin binder for example includes at least one of thermoplastic resin and thermosetting resin. The material to be molded may be in the form of powder, particles, pellets or the like, or it may be in the form of a sheet.

The carbon material for example includes artificial graphite, natural graphite, glassy carbon, carbon black, acetylene black, ketjen black and the like. These carbon materials can be used singly or two or more types thereof can be used in combination. These carbon materials in the form of powder/particles are not limited in geometry: they may be any in form of foil, a scale, a plate, a needle, a sphere, or an amorphous form. Furthermore, graphite that is chemically treated, i.e., exfoliated graphite, can also be used. When conductivity is considered, artificial graphite, natural graphite, and exfoliated graphite are preferable, as they can be used in a smaller amount to provide a bipolar plate having high conductivity.

The thermosetting resin can include for example phenol resin, epoxy resin, vinyl ester resin, urea resin, melamine resin, unsaturated polyester resin, silicone resin, diallyl phthalate resin, maleimide resin, polyimide resin, and the like. The thermosetting resin may be formed of not only one type of resin but also two or more types of resins mixed together.

The thermoplastic resin can include for example polyethylene, polypropylene, cycloolefin polymer, polystyrene, syndiotactic polystyrene, polyvinyl chloride, ABS resin, polyamide resin, polyacetals, polycarbonate, polyphenylene ether, denaturated polyphenylene ether, polyethylene terephthalate, polytrimethylene terephthalate, polybutylene terephthalate, polycyclohexylene terephthalate, polyphenylene sulfide, polythioether sulfone, polyether ether ketone, polyarylate, polysulfone, polyethersulfone, polyetherimide, polyamide-imide, thermoplastic polyimide, liquid crystal polymer, polytetrafluoroethylene copolymer, polyvinylidene fluoride, and similar fluorine resins; wholly aromatic polyester, semi aromatic polyester, poly lactic acid, polyester-polyester elastomer, polyester-polyether elastomer, and similar thermoplastic elastomers; and the like. Furthermore, as well as the thermosetting resin, the thermoplastic resin may also be formed not only of one type of resin but also two or more types of resins mixed together. Furthermore, the thermosetting resin and the thermoplastic resin may be used together in a composite.

The material to be molded is introduced into the FIG. 8 mold 10 and pressurized between mold member 11 and mold member 12. In doing so, mold members 11 and 12 are heated by a heat platen (not shown) and through mold members 11 and 12 the material to be molded is heated. If the resin binder contains the thermosetting resin, thus heating and pressurizing the material sets the thermosetting resin. Subsequently, fuel cell bipolar plate (or a molded product) 1 that is shown in FIG. 1 to FIG. 3 is removed from mold 10. If the resin binder contains the thermoplastic resin, then, thus heating and pressurizing the material melts the thermoplastic resin.

If the resin binder contains the thermoplastic resin, then, subsequently, mold members 11 and 12 are cooled by a cooling platen (not shown). In cooling the members, the material to be molded is still pressurized between mold member 11 and mold member 12. Thus cooling and pressurizing sets the melted thermoplastic resin. Subsequently, fuel cell bipolar plate (or a molded product) 1 that is shown in FIG. 1 to FIG. 3 is removed from mold 10.

Thus if the resin binder is formed of the thermosetting resin the material to be molded is heated and pressurized in mold 10 to obtain fuel cell bipolar plate (or molded product) 1, whereas if the resin binder is formed of the thermoplastic resin or the thermoplastic resin and the thermosetting resin then the material to be molded is heated and pressurized in mold 10 and cooled and pressurized in mold 10 to obtain fuel cell bipolar plate (or molded product) 1.

In the above molding process, the FIG. 8 mold 10 will cause flash between a side surface of recess 11a and that of projection 12a (i.e., at a region P1), between hole forming recess 12b and hole forming projection 11b (i.e., at a region P2), and between hole forming recess 11c and hole forming projection 12c (i.e., at a region P3).

The present embodiment provides a function and effect, as will be described hereinafter.

The present embodiment provides a fuel cell bipolar plate with receding portion 5a formed to have a geometry that can accommodate each flash 4, 4a, 4b. As such, when geometrically identical bipolar plates 1 for the fuel cell are stacked on one another, one bipolar plate 1 has its flash 4, 4a, 4b accommodated by the other bipolar plate 1 in receding portion 5a. Bipolar plates 1 can thus be disposed in sufficient contact with or sufficiently adjacent to one another.

Furthermore, flash 4, 4a, 4b projects in a direction crossing the bipolar plate 1 one surface 1A or the other surface 1B, rather than from the bipolar plate 1 side surface toward its outer periphery. Bipolar plates 1 can thus be positioned with satisfactory precision and thus stacked on one another.

Furthermore, it is unnecessary to remove flash 4, 4a, 4b. A complicated deflashing step can be dispensed with.

Second Embodiment

Figure 10:
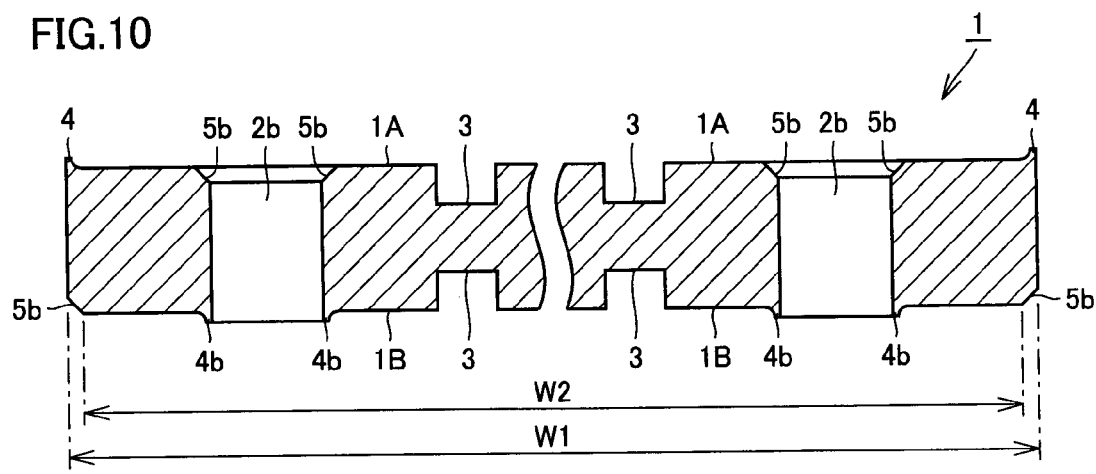
FIG. 10 is a partially exploded cross section schematically showing a configuration of a fuel cell bipolar plate in a second embodiment of the present invention.
Figure 11:
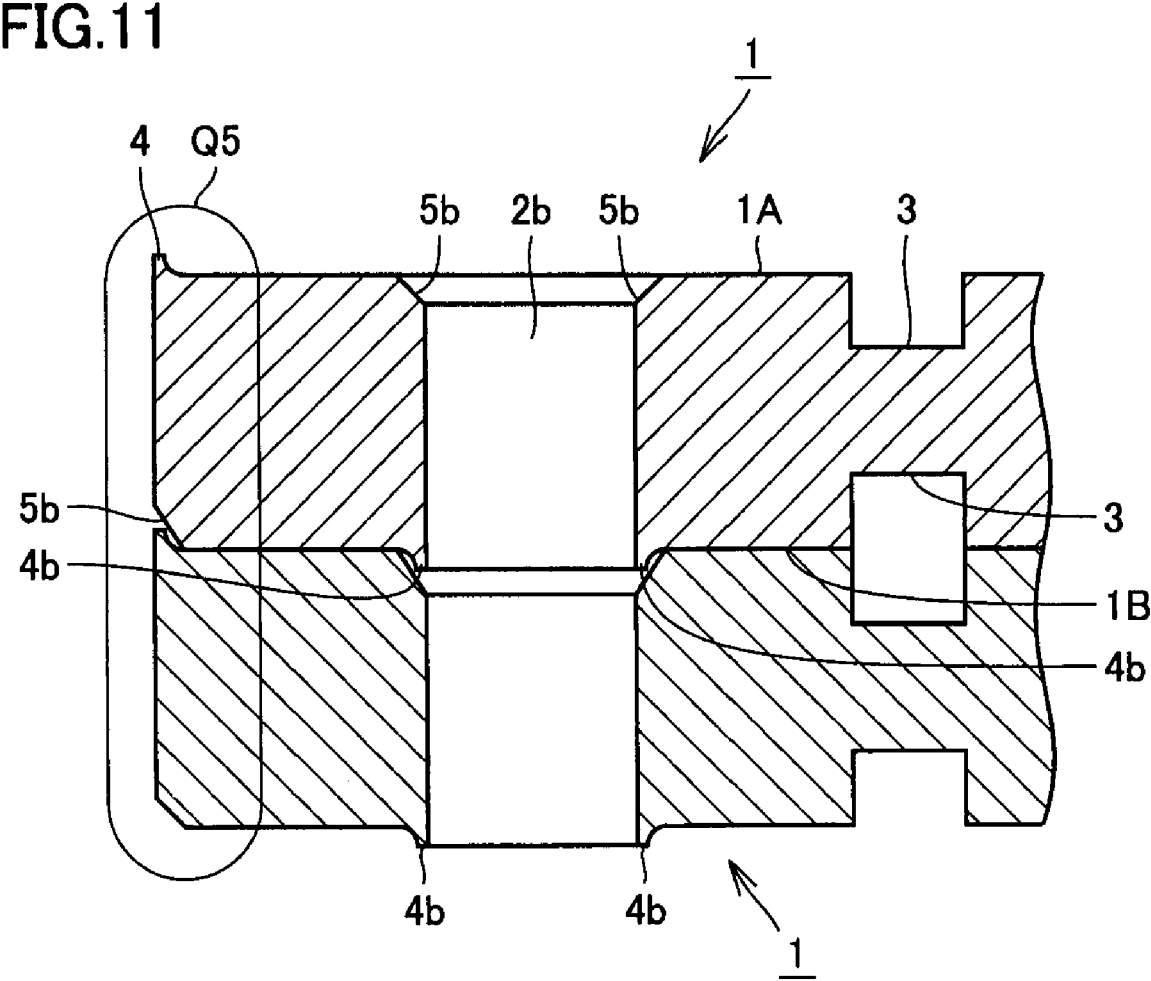
FIG. 11 is a schematic cross section of the FIG. 10 bipolar plate stacked on another such bipolar plate.
Figure 12:
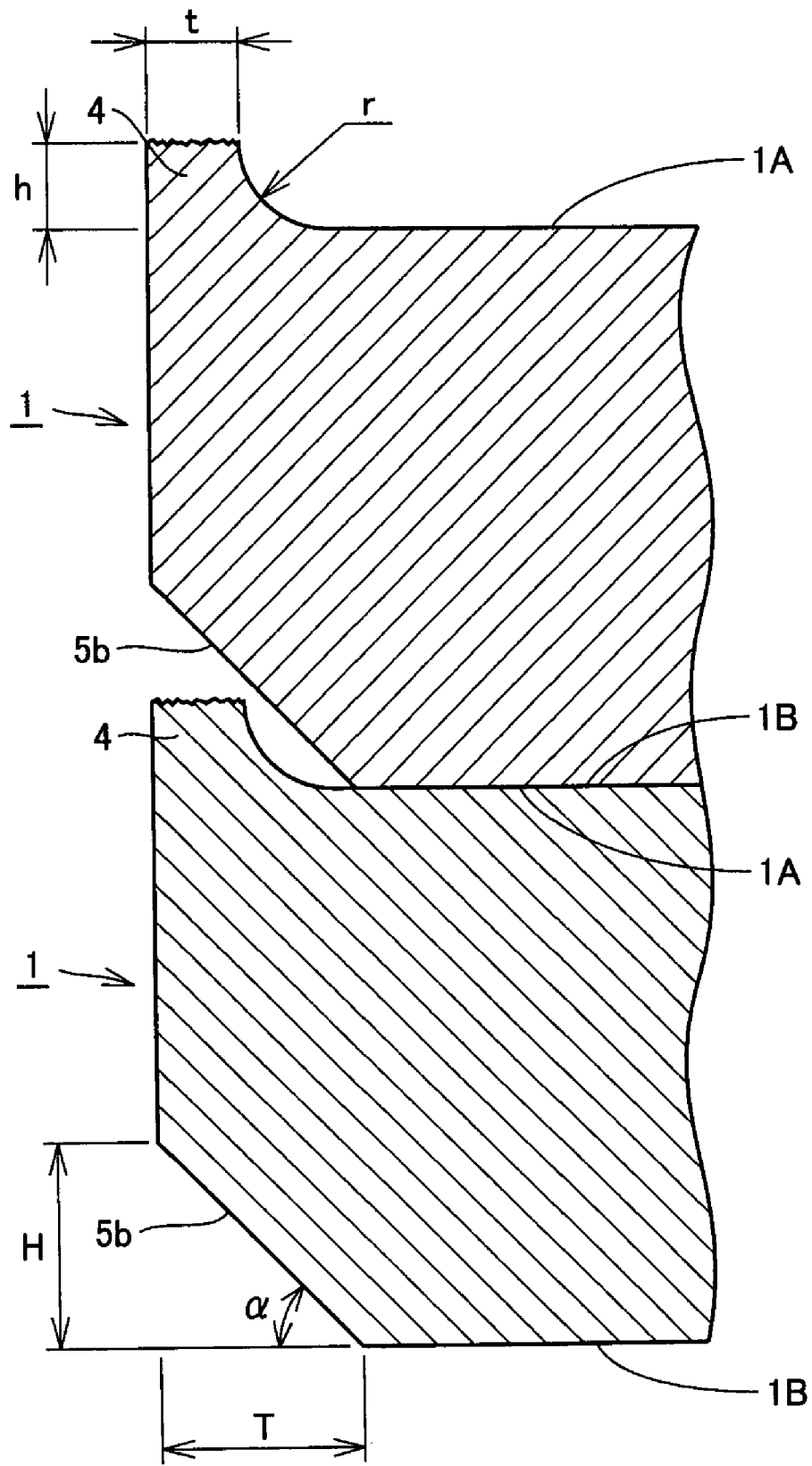
FIG. 12 is a schematic, enlarged cross section of a region Q5 shown in FIG. 11

FIG. 10 is a partially exploded cross section schematically showing a configuration of a fuel cell bipolar plate in a second embodiment of the present invention. FIG. 11 is a schematic cross section of the FIG. 10 bipolar plate stacked on another such bipolar plate. FIG. 12 is a schematic, enlarged cross section of a region Q5 shown in FIG. 11

The present embodiment provides fuel cell bipolar plate 1, that has a receding portion different in geometry from that of the first embodiment. With reference to FIG. 10 to FIG. 12, the present embodiment provides bipolar plate 1 having an outer peripheral portion having a receding portion 5b notched to taper to reduce bipolar plate 1 in width in a direction from a side of one surface 1A of bipolar plate 1 toward a side of the other surface 1B of bipolar plate 1. Thus, as shown in FIG. 10, bipolar plate 1 has one surface 1A having a width W1 and the other surface 1B having a width W2 smaller than width W1.

Furthermore, hole 2b has a peripheral portion having receding portion 5b notched to taper to allow hole 2b to have an aperture having a diameter increased as seen in a direction from a side of the other surface 1B of bipolar plate 1 toward a side of one surface 1A of bipolar plate 1. Furthermore, although not shown, hole 2a has a peripheral portion having receding portion 5b notched to taper to allow hole 2a to have an aperture having a diameter increased as seen in a direction from a side of one surface 1A of bipolar plate 1 toward a side of the other surface 1B of bipolar plate 1.

These tapering notches each have a linearly extending portion in the cross sections shown in FIG. 10 to FIG. 12. Furthermore, these receding portions 5b are each basically only required to have a dimension that can accommodate flash 4, 4a, 4b. If bipolar plate 1 has an outer peripheral portion having receding portion 5b notched to taper, as described in the present embodiment, and a tapering angle α (an angle formed by the other surface 1B and a tapered surface) shown in FIG. 12 is for example 45°, receding portion 5b is only required to have width T and height H each equal to or larger than a sum of thickness t of flash 4 and the radius of curvature r of flash 4 shown in FIG. 5 (i.e., T≧t+r, and H≧t+r). Receding portion 5b tapered as it is notched has width T for example of at least 0.07 mm and at most 0.25 mm and height H for example of at least 0.07 mm. Receding portion 5b formed at the peripheral portion of each hole 2a, 2b is similar in geometry to receding portion 5b formed at the outer peripheral portion of bipolar plate 1 described above. Note that preferably dimensions H, T have an upper limit set to be a dimension that does not affect the molded product in geometry, and stability in dimension.

Figure 28:
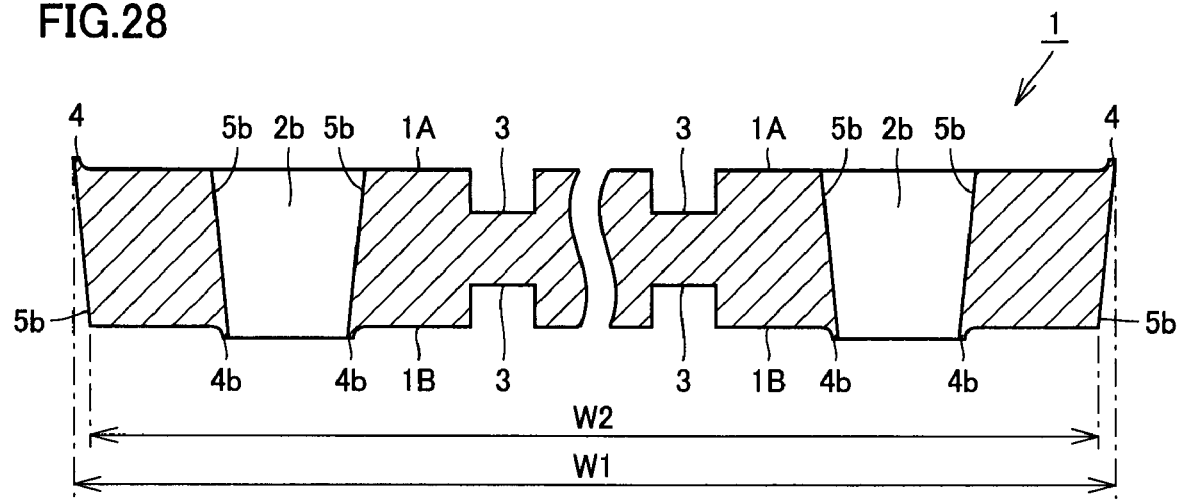
FIG. 28 is a cross section schematically showing a configuration of a fuel cell bipolar plate, that has an outer peripheral portion tapered entirely from one surface toward the other surface.

Furthermore, the above described tapering notch may taper all the way from one surface 1A to the other surface 1B, as shown in FIG. 28. In that case, bipolar plate 1 at an outer peripheral portion thereof has a side surface entirely notched and thus tapered, and holes 2a, 2b for manifolds each have a wall surface entirely notched and thus tapered.

Except for receding portion 5b, the fuel cell bipolar plate according to the present embodiment is substantially identical in configuration to that according to the first embodiment. Accordingly, identical components are identically denoted and will not be described repeatedly.

If the above described fuel cell bipolar plate 1 is stacked on another such bipolar plate, more than one bipolar plate 1 shown in FIG. 10 is prepared. (For example, two such bipolar plates are prepared.) These bipolar plates 1 are positioned, and thereafter stacked on one another, as shown in FIG. 11 and FIG. 12. With the bipolar plates thus stacked, receding portion 5b is located at a position corresponding to that having flash 4, 4a, 4b, as has been described above, and as receding portion 5b has a dimension that can accommodate flash 4, 4a, 4b, flash 4, 4a, 4b is each accommodated in receding portion 5b, as shown in FIG. 11 and FIG. 12.

Hereinafter a mold will be described for producing fuel cell bipolar plate 1 in the present embodiment.

Figure 13:
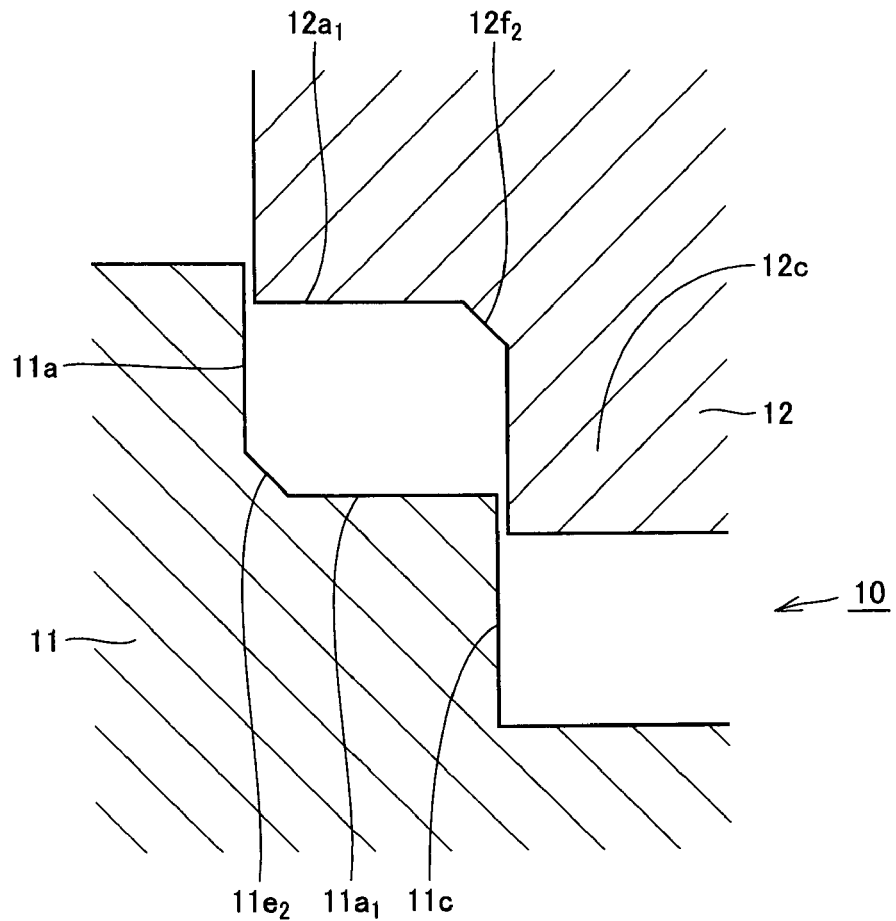
FIG. 13 is a cross section schematically showing a configuration of a mold employed to mold the fuel cell bipolar plate in the second embodiment of the present invention, the configuration having shown enlarged a portion corresponding to region Q4 shown in FIG. 8.

FIG. 13 is a cross section schematically showing a configuration of a mold employed to mold the fuel cell bipolar plate in the second embodiment of the present invention, the configuration having shown enlarged a portion corresponding to region Q4 shown in FIG. 8.

Mold 10 in the present embodiment is different in configuration from the mold in the first embodiment as shown in FIG. 8 and FIG. 9 in that they have receding portion forming projections, respectively, that are different in geometry for forming different receding portions. With reference to FIG. 13, the present embodiment provides mold 10 such that mold member 11 has recess 11a having a peripheral portion surrounded by a receding portion forming projection $11e_2$ tapered in cross section, hole forming projection 11b has a foot having a peripheral portion surrounded by a receding portion forming projection (not shown) tapered in cross section, and hole forming projection 12c has a foot having a peripheral portion surrounded by a receding portion forming projection $12f_2$ tapered in cross section.

Except for the above configuration, mold 10 in the present embodiment is substantially identical in configuration to mold 10 in the first embodiment. Accordingly, identical components are identically denoted and will not be described repeatedly. Furthermore, the method that employs mold 10 as described above to produce fuel cell bipolar plate 1 in the present embodiment is also substantially identical to the method described in the first embodiment. Accordingly, it will not be described repeatedly.

The present embodiment also provides fuel cell bipolar plate 1, that can achieve a function and effect similar to that of the first embodiment.

Third Embodiment

Figure 14:
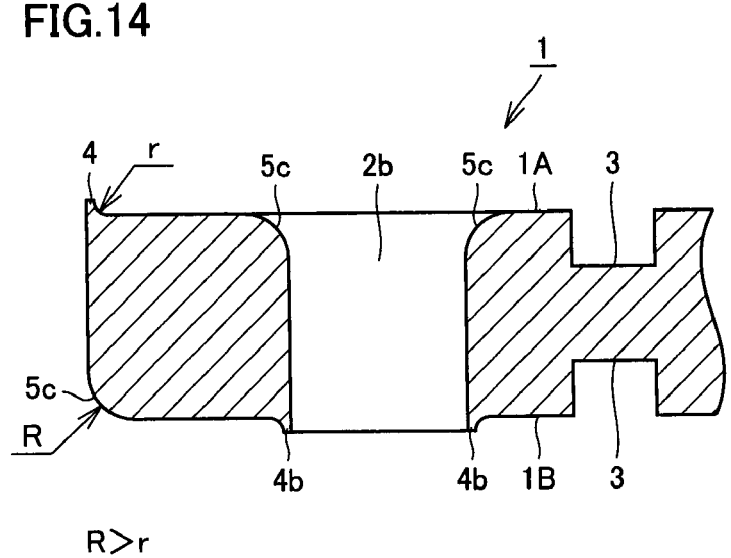
FIG. 14 is a schematic cross section of a configuration of a fuel cell bipolar plate in a third embodiment of the present invention, the configuration having shown enlarged a portion corresponding to region Q1 shown in FIG. 3.
Figure 15:
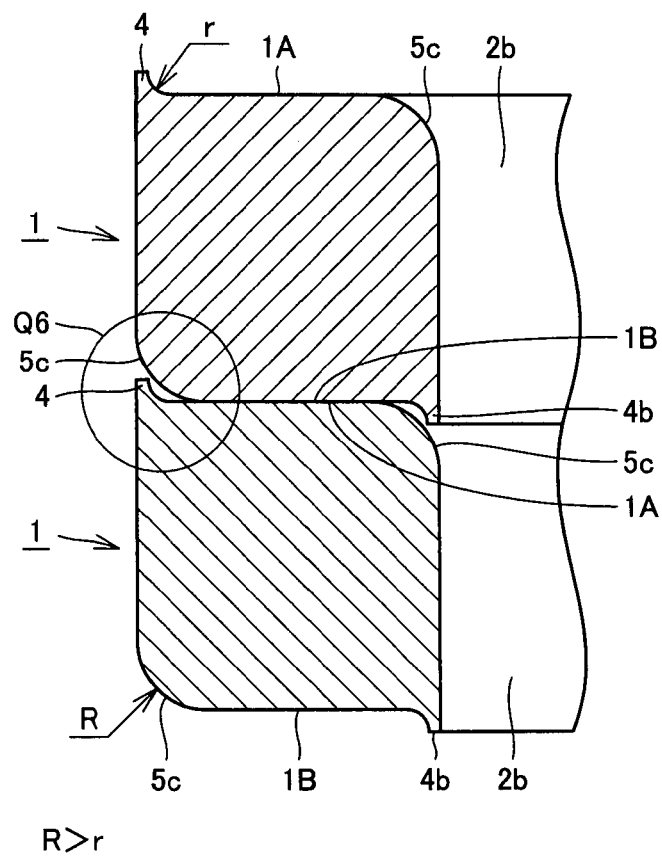
FIG. 15 is a schematic cross section of the FIG. 14 bipolar plate stacked on another such bipolar plate.
Figure 16:
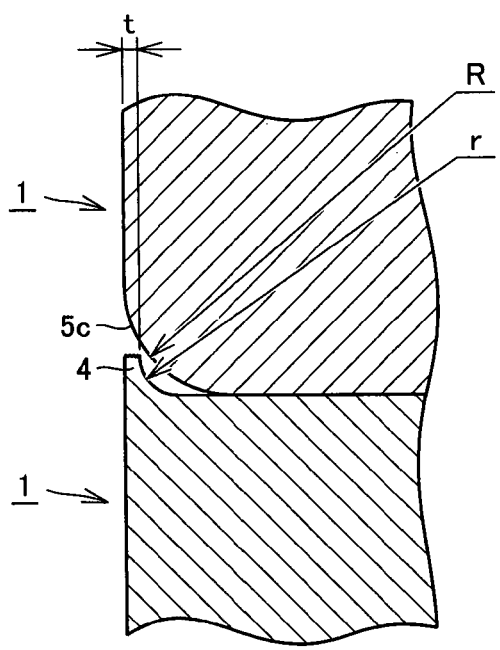
FIG. 16 is a schematic, enlarged cross section of a region Q6 shown in FIG. 15.

FIG. 14 is a schematic cross section of a configuration of a fuel cell bipolar plate in a third embodiment of the present invention, the configuration having shown enlarged a portion corresponding to region Q1 shown in FIG. 3. FIG. 15 is a schematic cross section of the FIG. 14 bipolar plate stacked on another such bipolar plate. FIG. 16 is a schematic, enlarged cross section of a region Q6 shown in FIG. 15.

The present embodiment provides fuel cell bipolar plate 1, that is different from that of the first embodiment in the receding portion's geometry. With reference to FIG. 14 to FIG. 16, in the present embodiment, a receding portion 5c is notched to allow bipolar plate 1 to have an outer peripheral portion having a corner with a radius of curvature R and holes 2a, 2b to have a peripheral portion having a corner with the radius of curvature R. As shown in FIG. 14 the radius of curvature R of receding portion 5c is larger than the radius of curvature r of flash 4.

Basically, receding portion 5c is only required to have a dimension that can accommodate flash 4. If receding portion 5c has the radius of curvature R, as described in the present embodiment, then, as shown in FIG. 16, the radius of curvature R of receding portion 5c is only required to be equal to or larger than a sum of three times the radius of curvature r of flash 4 and thickness t of flash 4 (i.e., R≧3×r+t). Note that preferably the radius of curvature R has an upper limit set to avoid affecting the molded product in geometry, and stability in dimension.

Except for the above configuration, fuel cell bipolar plate 1 in the present embodiment is substantially identical in configuration to that in the first embodiment. Accordingly, identical components are identically denoted and will not be described repeatedly.

If the above described fuel cell bipolar plate 1 is stacked on another such bipolar plate, more than one bipolar plate 1 shown in FIG. 14 is prepared. (For example, two such bipolar plates are prepared.) These bipolar plates 1 are positioned, and thereafter stacked on one another, as shown in FIG. 15 and FIG. 16. With the bipolar plates thus stacked, receding portion 5c is located at a position corresponding to that having flash 4, 4a, 4b, as has been described above, and as receding portion 5c has a dimension that can accommodate flash 4, 4a, 4b, flash 4, 4a, 4b is accommodated in receding portion 5c, as shown in FIG. 15 and FIG. 16.

Hereinafter a mold will be described for producing fuel cell bipolar plate 1 in the present embodiment.

Figure 17:
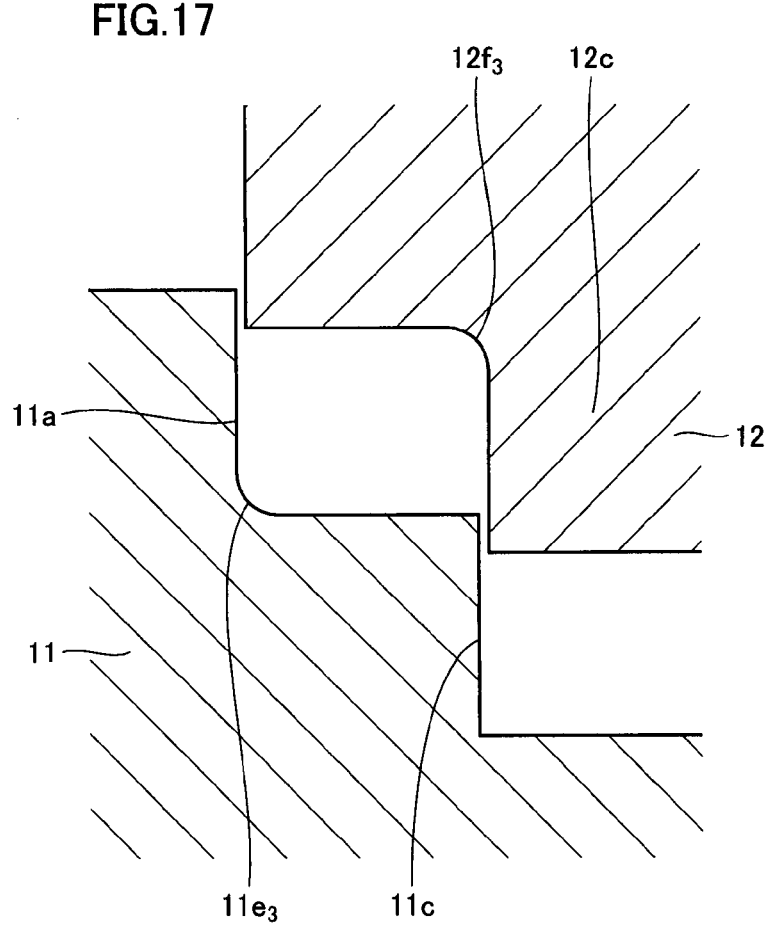
FIG. 17 is a cross section schematically showing a configuration of a mold employed to mold the fuel cell bipolar plate in the third embodiment of the present invention, the configuration having shown enlarged a portion corresponding to region Q4 shown in FIG. 8.

FIG. 17 is a cross section schematically showing a configuration of a mold employed to mold the fuel cell bipolar plate in the third embodiment of the present invention, the configuration having shown enlarged a portion corresponding to region Q4 shown in FIG. 8.

Mold 10 in the present embodiment is different in configuration from the mold in the first embodiment as shown in FIG.

8 and FIG. 9 in that they have receding portion forming projections, respectively, that are different in geometry for forming different receding portions. With reference to FIG. 17, the present embodiment provides mold 10 such that mold member 11 has recess 11a having a peripheral portion surrounded by a receding portion forming projection 11$e_3$ round to have the radius of curvature R in cross section, hole forming projection 11b has a foot having a peripheral portion surrounded by a receding portion forming projection (not shown) round to have the radius of curvature R in cross section, and hole forming projection 12c has a foot having a peripheral portion surrounded by a receding portion forming projection 12$f_3$ round to have the radius of curvature R in cross section.

Except for the above configuration, mold 10 in the present embodiment is substantially identical in configuration to that in the first embodiment. Accordingly, identical components are identically denoted and will not be described repeatedly. Furthermore, the method that employs mold 10 as described above to produce fuel cell bipolar plate 1 in the present embodiment is also substantially identical to the method described in the first embodiment. Accordingly, it will not be described repeatedly.

The present embodiment also provides fuel cell bipolar plate 1, that can achieve a function and effect similar to that of the first embodiment.

Fourth Embodiment

Figure 18:
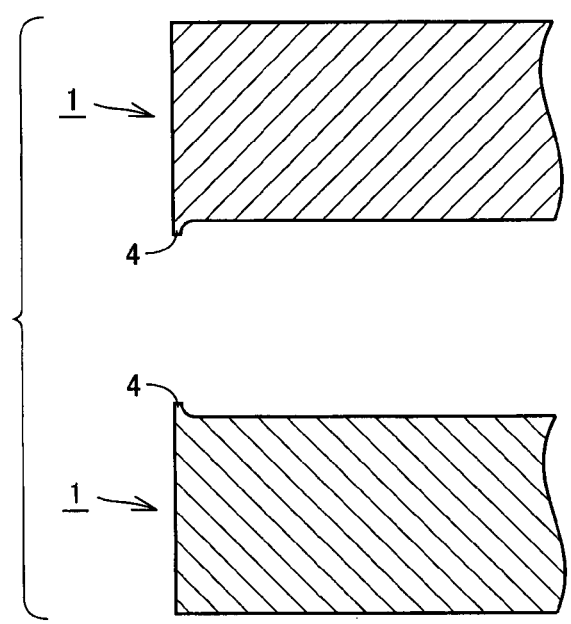
FIG. 18 shows in a schematic cross section bipolar plates stacked on one another such that their respective surfaces having flash face each other.
Figure 19:
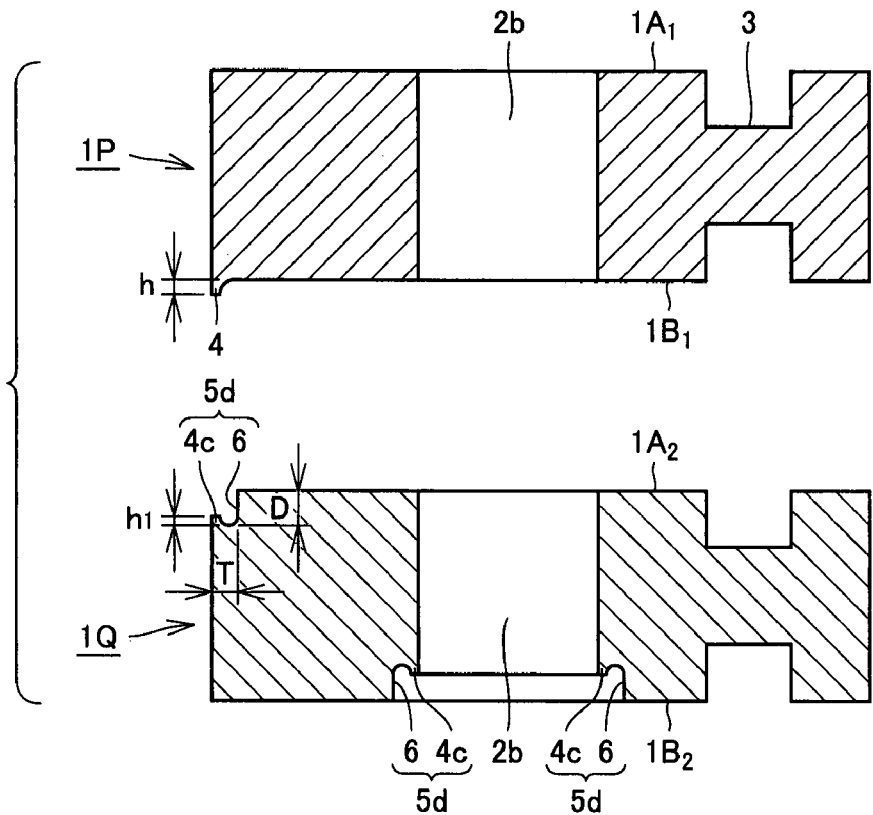
FIG. 19 is a schematic cross section of two fuel cell bipolar plates in a fourth embodiment of the present invention, with a portion that corresponds to region Q1 of FIG. 3 shown enlarged.

If a plurality of bipolar plates are stacked on one another for a fuel cell, bipolar plates 1 may be stacked such that their surfaces that have flash 4 face each other, as shown in FIG. 18. In that case, flash 4 prevents bipolar plates 1 from being in sufficient contact with or sufficiently adjacent to one another. Accordingly in the present embodiment a recess 6 is provided at a portion having flash 4, as shown in FIG. 19. More specifically, the present embodiment provides a fuel cell bipolar plate, that is configured, as will be described hereinafter more specifically.

Figure 20:
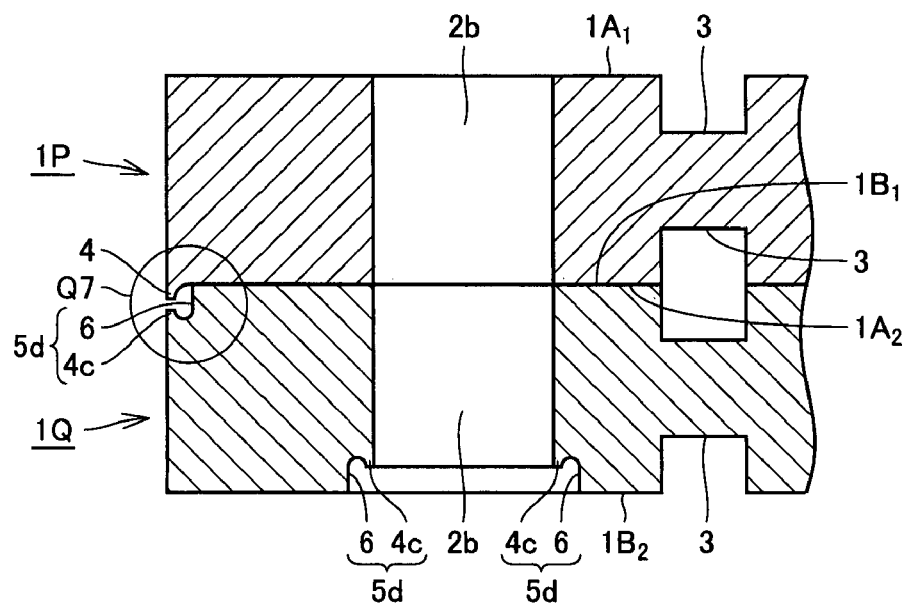
FIG. 20 shows in a schematic cross section the FIG. 19 two bipolar plates stacked on each other.
Figure 21:
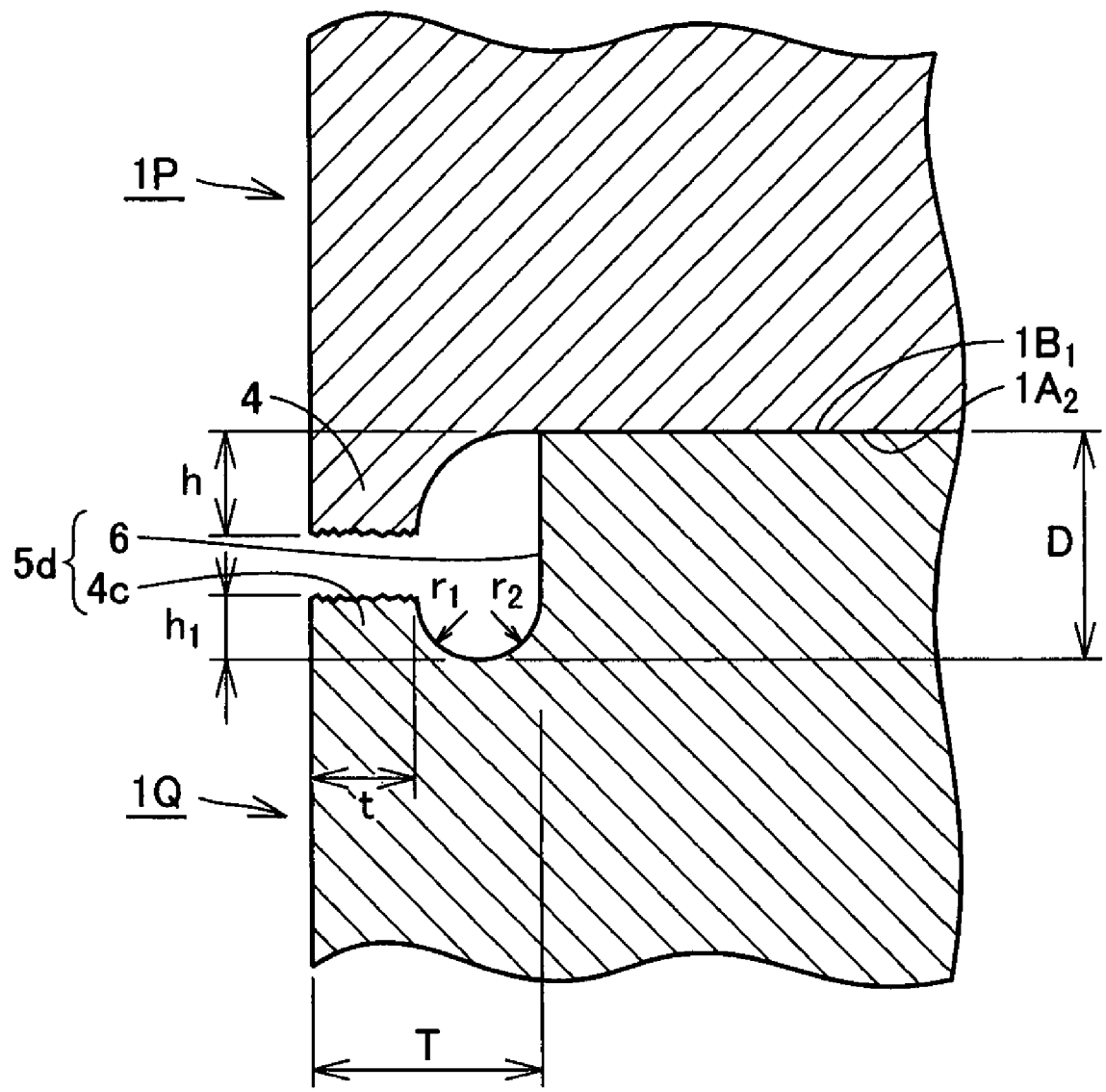
FIG. 21 is a schematic, enlarged cross section of a region Q7 shown in FIG. 20.

FIG. 19 is a schematic cross section of two fuel cell bipolar plates in a fourth embodiment of the present invention, with a portion that corresponds to region Q1 of FIG. 3 shown enlarged. FIG. 20 shows in a schematic cross section the FIG. 19 two bipolar plates stacked on each other. FIG. 21 is a schematic, enlarged cross section of a region Q7 shown in FIG. 20.

With reference to FIG. 19, first and second fuel cell bipolar plates 1P, 1Q are stacked on each other. Similarly as described in the first embodiment, these first and second bipolar plates 1P, 1Q each have holes 2a (not shown), 2b for manifolds.

First bipolar plate 1P has a surface $1B_1$ facing second bipolar plate 1Q and having an outer peripheral portion having flash 4 projecting in a direction crossing surface $1B_1$. Second bipolar plate 1Q has a surface $1A_2$ facing first bipolar plate 1P and having an outer peripheral portion having a receding portion 5d capable of accommodating flash 4.

Furthermore, bipolar plate 1Q has a surface $1B_2$ having receding portion 5d located at a peripheral portion of hole 2b to be capable of accommodating flash 4. Furthermore, although not shown, bipolar plate 1Q has surface $1A_2$ having receding portion 5d located at a peripheral portion of hole 2a to be capable of accommodating flash 4.

These receding portions 5d are configured of recess 6 and flash 4c provided in the recess and projecting from a bottom surface of recess 6. Recess 6 has a depth D equal to or larger than a sum of a height $h_1$ of flash 4c in the recess and height h of flash 4 (i.e., $D \geq h_1 + h$). In other words, height $h_1$ of flash 4c in the recess is smaller than depth D of recess 6 and thus will not project outside recess 6 (i.e., from surface $1A_2$ or surface $1B_2$). Furthermore, recess 6 has width T equal to or larger than a sum of width t of flash 4c in the recess, a radius of curvature $r_1$ of flash 4c in the recess, and a radius of curvature $r_2$ opposite thereto (i.e., $T \geq t + r_1 + r_2$).

The first bipolar plate 1P surface $1A_1$ does not have flash, a receding portion for accommodating the flash, or the like.

Except for the above configuration, first and second bipolar plates 1P, 1Q in the present embodiment are substantially identical in configuration to bipolar plate 1 of the first embodiment described above. Accordingly, identical components are identically denoted and will not be described repeatedly.

The FIG. 19 first and second fuel cell bipolar plates 1P cell are mutually positioned and thereafter stacked on one another, as shown in FIG. 20 and FIG. 21. With the bipolar plates stacked as shown in FIG. 20 and FIG. 21, receding portion 5d has recess 6 located at a position corresponding to that having flash 4, as has been described above, and as recess 6 also has a dimension that can accommodate flash 4, flash 4 is accommodated in receding portion 5d at recess 6.

Figure 29:
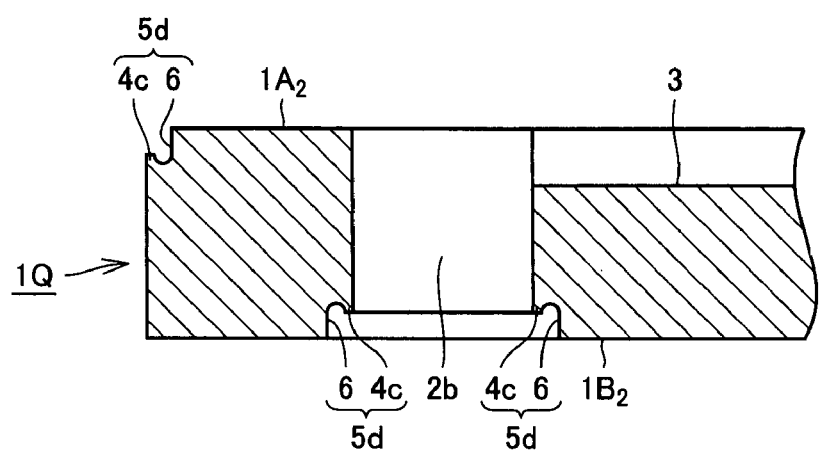
FIG. 29 is a partial cross section schematically showing a configuration of a fuel cell bipolar plate, that has a receding portion in a manifold that is connected to a channel, at a side unconnected to the channel.

Note that as shown in FIG. 29, bipolar plate Q may have one surface (e.g., one surface $1A_2$) alone having channel 3 and may not have the other surface $1B_2$ having channel 3. In that case, the surface (i.e., the other surface $1B_2$) opposite to that (i.e., one surface $1A_2$) at which holes 2a (not shown), 2b for manifolds are each connected to channel 3, has receding portion 5d formed at a peripheral portion of each of holes 2a (not shown), 2b for manifolds. Furthermore, there is not flash at a portion at which each of holes 2a (not shown), 2b for manifolds and channel 3 are connected.

FIG. 29 is a cross section of a portion at which a hole for a manifold is connected to a channel on one surface.

Hereinafter a mold will be described for producing second fuel cell bipolar plate 1Q in the present embodiment.

Figure 22:
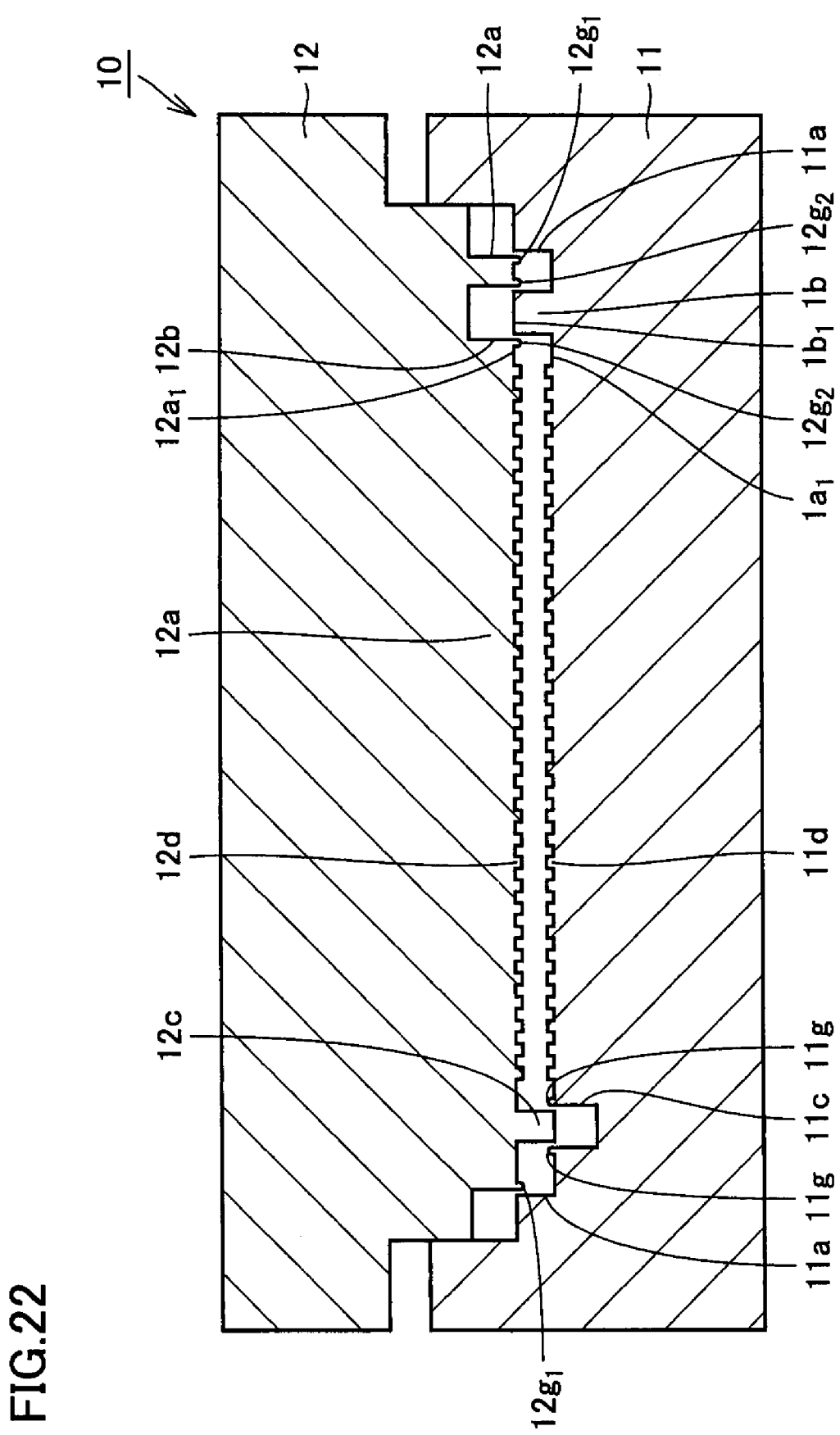
FIG. 22 is a cross section schematically showing a configuration of a mold employed to mold a second fuel cell bipolar plate in the fourth embodiment of the present invention.

FIG. 22 is a cross section schematically showing a configuration of a mold employed to mold a second fuel cell bipolar plate in the fourth embodiment of the present invention. With reference to FIG. 22, mold 10 is a mold employed to mold a material to be molded and has mold member 11 and mold member 12. Mold member 11 has a surface facing mold member 12 and having recess 11a. Mold member 12 has a surface facing mold member 11 and having projection 12a provided to correspond to recess 11a. Recess 11a and projection 12a are configured such that when mold members 11 and 12 are joined together recess 11a of mold member 11 receives projection 12a of mold member 12.

Mold member 11 has recess 11a having bottom surface $11a_1$ having channel forming projection 11d for forming a channel for gas or the like, and hole forming projection 11b and hole forming recess 11c for forming a hole for a manifold.

Mold member 12 has projection 12a having top surface 12a, opposite to bottom surface $11a_1$ of recess 11a. Top surface $12a_1$ has channel forming projection 12d for forming a channel for gas or the like, and hole forming recess 12b and hole forming projection 12c for forming a hole for a manifold.

The mold member 11 hole forming projection 11b is provided to correspond to the mold member 12 hole forming recess 12b and the mold member 11 hole forming recess 11c is provided to correspond to the mold member 12 hole forming projection 12c.

Mold member 12 has projection 12a having an outer peripheral portion surrounded by a receding portion forming projection $12g_1$, provided at top surface $12a_1$. Furthermore, hole forming recess 12b has a peripheral portion surrounded by a receding portion forming projection $12g_2$ provided at top surface $12a_1$. Furthermore, hole forming recess $11c$ has a peripheral portion surrounded by a receding portion forming projection $11g$ provided at bottom surface $11a_1$. These receding portion forming projections $12g_1$, $12g_2$, $11g$ are each for example a pointed step in cross section.

The method that employs mold 10 as described above to produce second fuel cell bipolar plate 1Q in the present embodiment is substantially identical to the method employed to produce bipolar plate 1 in the first embodiment. Accordingly, it will not be described repeatedly.

The present embodiment also provides bipolar plates 1P, 1Q that can achieve a function and effect similar to that of the first embodiment.

Of the above described embodiments, a bipolar plate having one surface having flash and the other surface having a receding portion, which corresponds to the first to third embodiments, is preferable to a pair of a bipolar plate having one surface having flash and a bipolar plate having one surface opposite to the paired bipolar plate and having a receding portion accommodating the flash, which corresponds to the fourth embodiment, in that the former can be produced in a single mold.

Fuel Cell

Figure 23A:
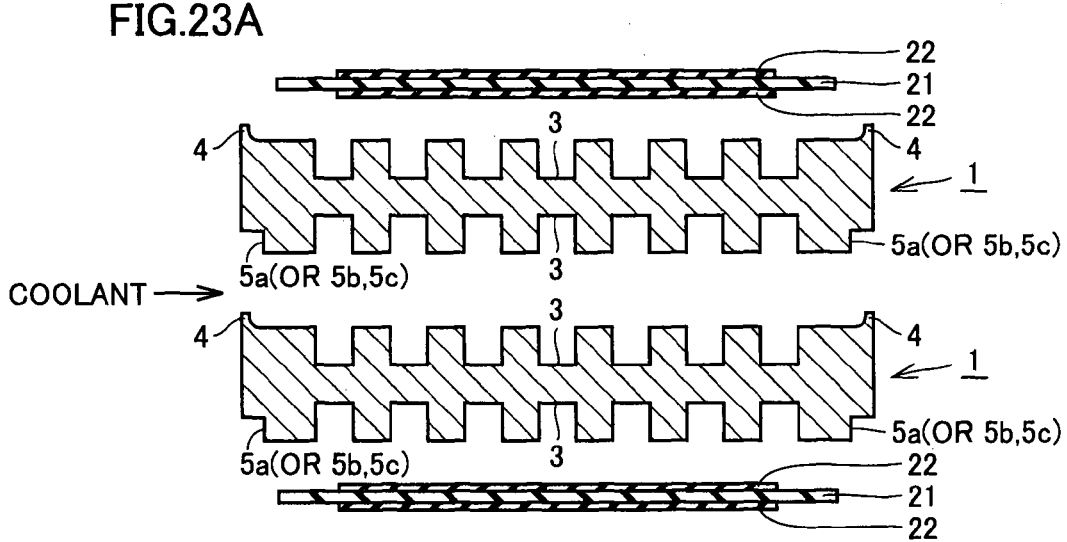
FIG. 23A is an exploded cross section schematically showing a configuration of a fuel cell, with a pair of fuel cell bipolar plates and an MEA stacked alternately on each other.
Figure 23B:
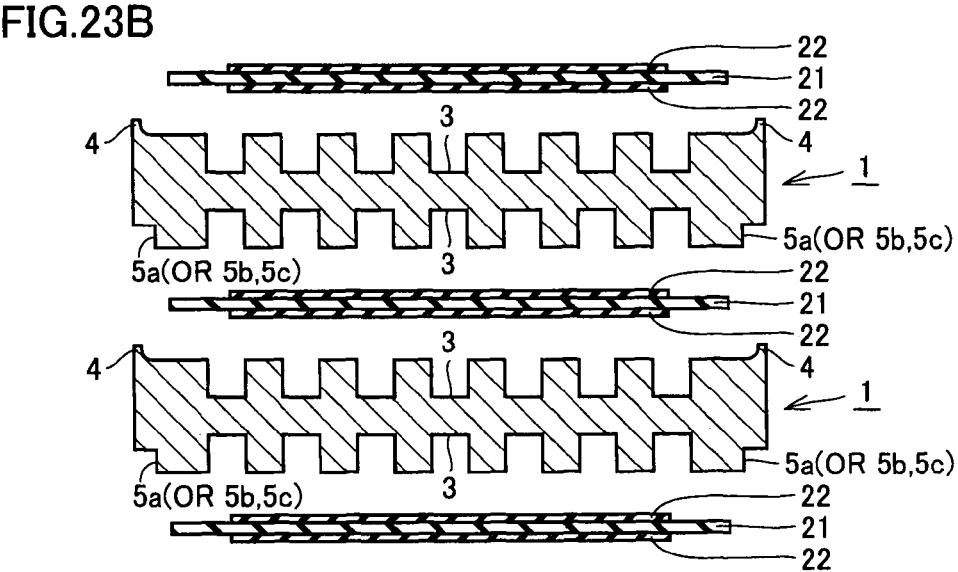
FIG. 23B is an exploded cross section schematically showing a configuration of a fuel cell, with a single fuel cell bipolar plate and an MEA stacked alternately on each other.
Figure 23C:
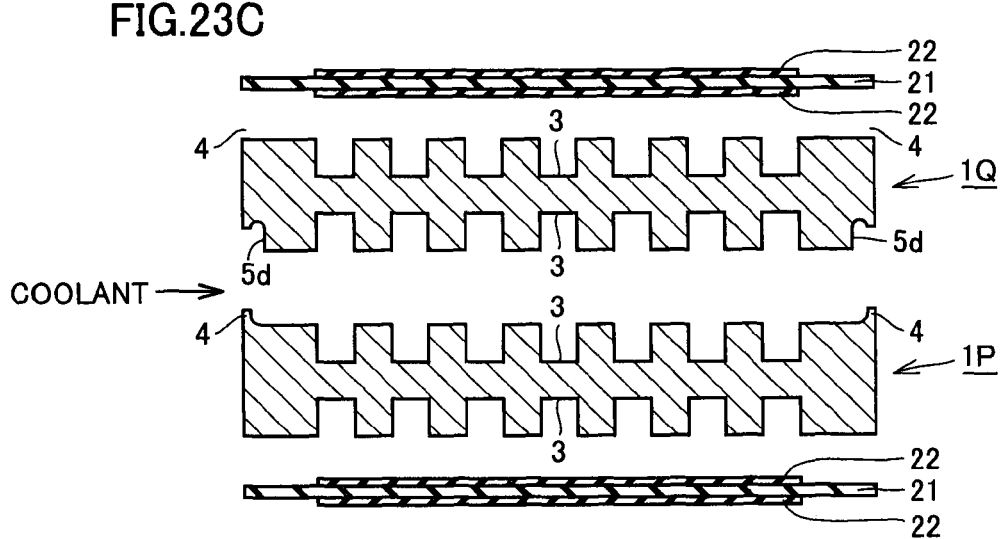
FIG. 23C is an exploded cross section schematically showing a configuration of a fuel cell, with a pair of fuel cell bipolar plates and an MEA stacked alternately on each other.
Figure 24A:
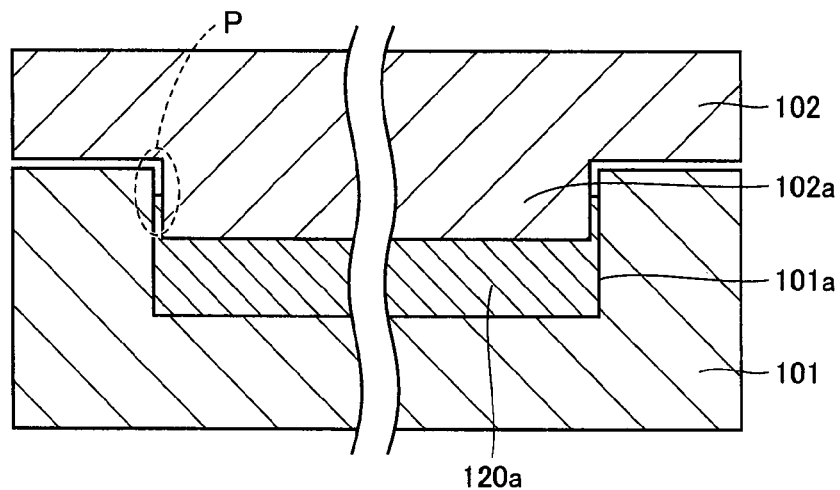
FIG. 24A is a cross section of a configuration of a compression mold of a conventional share edge structure.
Figure 24B:
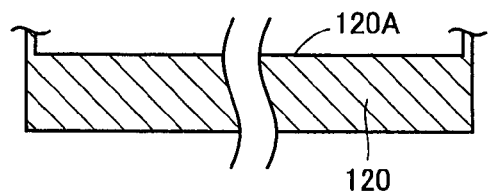
FIG. 24B is a cross section of a configuration of a molded product molded in a compression mold of a conventional share edge structure.
Figure 25A:
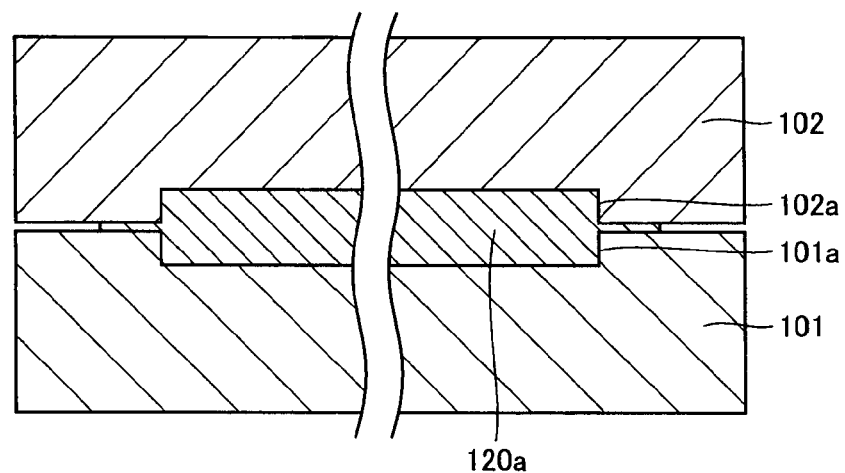
FIG. 25A is a cross section of a conventional, joined-type compression mold.
Figure 25B:
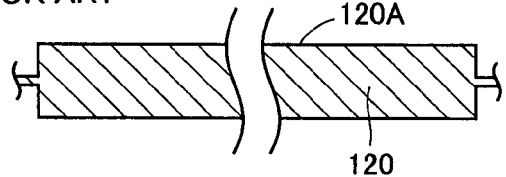
FIG. 25B is a cross section of a configuration of a molded product molded in the conventional, joined-type compression mold.

Bipolar plate 1 (or 1P, 1Q) obtained as described above in the first to fourth embodiments can be used to fabricate a fuel cell. FIG. 23A, FIG. 23B and FIG. 23C are each an exploded cross section schematically showing a fuel cell different in configuration. With reference to FIG. 23A, the fuel cell has at least a pair of bipolar plates 1 described in the first to third embodiment, and the pair of bipolar plates 1, 1 and a membrane electrode assembly are alternately stacked to configure the fuel cell. The membrane electrode assembly is configured for example of a solid polymer electrolyte membrane 21 and a pair of electrodes 22, 22 serving as a fuel electrode and an oxidant electrode and sandwiching solid polymer electrolyte membrane 21. The pair of bipolar plates 1, 1 has one bipolar plate 1 having flash 4 and the other bipolar plate 1 having receding portion $5a$ (or $5b$, $5c$) accommodating flash 4.

Furthermore, with reference to FIG. 23B, the fuel cell includes bipolar plate 1 described in the first to third embodiments, and bipolar plate 1 and a membrane electrode assembly are alternately stacked to configure the fuel cell. Bipolar plate 1 has flash 4 accommodated in receding portion $5a$ (or $5b$, $5c$) of bipolar plate 1 opposite with the membrane electrode assembly posed therebetween.

Furthermore, with reference to FIG. 23C, the fuel cell is configured of a pair of bipolar plates 1P, 1Q of the fourth embodiment and a membrane electrode assembly alternately stacked. The pair of bipolar plates has bipolar plate 1P having one surface having an outer peripheral portion having flash 4 projecting in a direction crossing the surface. Furthermore, The pair of bipolar plates has bipolar plate 1Q having one surface having an outer peripheral portion having receding portion $5d$ having a geometry that can accommodate flash 4. The pair of bipolar plates 1P, 1Q is stacked such that a surface having flash 4 and that having receding portion $5d$ face each other. Flash 4 of bipolar plate 1P is thus accommodated in receding portion $5d$ of bipolar plate 1Q.

Note that FIG. 23A to FIG. 23C do not show a hole for a manifold for the sake of convenience for illustration. Furthermore, bipolar plate 1 in each of FIG. 26 and FIG. 27 may be stacked as bipolar plate 1 in FIG. 23A, and furthermore, may be stacked as bipolar plate 1 in FIG. 23B. Furthermore, bipolar plate 1 in FIG. 28 may be stacked as bipolar plate 1 in FIG. 23A, and furthermore, may be stacked as bipolar plate 1 in FIG. 23B. Furthermore, bipolar plate 1Q in FIG. 29 may be stacked as bipolar plate 1Q in FIG. 23C together with another bipolar plate 1P.

The fuel cell is provided as a stack of cells configured of bipolar plates and an MEA and disposed in series for the purpose of increasing its performance to generate electric power. The fuel cell provided as a stack of cells, as described above, may have a coolant passed between the cells, and in that case, as shown in FIG. 23A and FIG. 23C, bipolar plate 1 (or 1P, 1Q) is provided with a coolant channel 3 passing the coolant. Furthermore, a type of miniature fuel cell used for a mobile phone or the like is a fuel cell having a stacked structure that does not have a coolant channel passing a coolant, and this fuel cell will be structured of a bipolar plate and a membrane electrode assembly alternately stacked in layers, as shown in FIG. 23B.

In the FIG. 23A and FIG. 23C configurations, paired bipolar plates sandwiching a coolant channel are equal in potential, and accommodating flash in a receding portion allows the bipolar plates to be in sufficient contact with each other. Paired bipolar plates 1 sandwiching a membrane electrode assembly, as shown in FIG. 23B, will be opposite in potential, (i.e., associated with an anode and a cathode) and thus cannot be brought into contact with each other. However, accommodating flash in a receding portion allows the bipolar plates to be disposed sufficiently adjacently.

Such a fuel cell has hydrogen gas or methanol or the like ionized at a fuel electrode 22 and thereafter passing through solid polymer electrolyte membrane 21 to react at an oxidant electrode 22 with oxygen or the like in the air and thus generate electric power.

The present embodiment can provide a fuel cell bipolar plate, that is suitably applicable to the above described solid polymer fuel cell and in addition a hydrazine fuel cell, a direct methanol fuel cell, an alkaline fuel cell, a phosphoric acid fuel cell and a like, variety of fuel cells.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

INDUSTRIAL APPLICABILITY

The present invention is advantageously applicable particularly to a fuel cell bipolar plate and a fuel cell employing the bipolar plate, that can be used for a phosphoric acid fuel cell, a direct methanol fuel cell, a solid polymer fuel cell and a similar fuel cell applied to a power supply for an electric vehicle, a portable power supply, a power supply for emergency, and the like.

The invention claimed is:

1. A fuel cell bipolar plate, comprising:
   a first surface, said first surface having a flash projecting from an outer peripheral portion of said first surface in a direction crossing said first surface, and
   a second surface, said second surface having a receding portion formed along an outer peripheral portion of said second surface,
   wherein a geometry of said receding portion of said second surface is capable of accommodating said flash of said first surface, and
   wherein said fuel cell bipolar plate includes a conductive carbon material and a resin binder.

2. The fuel cell bipolar plate according to claim 1, wherein said receding portion forms a step.

3. A fuel cell, comprising:
a pair of bipolar plates as recited in claim 1; and
a membrane electrode assembly stacked alternately with said pair of bipolar plates,
wherein a first one of said pair of bipolar plates has said flash accommodated in said receding portion of a second one of said pair of bipolar plates.

4. A fuel cell, comprising:
a plurality of bipolar plates, as recited in claim 1; and
a membrane electrode assembly stacked alternately with said plurality of bipolar plates,
wherein a first one of said plurality of bipolar plates has said flash accommodated in said receding portion of a second one of said plurality of bipolar plates, which is opposite to said first one of said plurality of bipolar plates, and
wherein said membrane electrode assembly is interposed between said first one of said plurality of bipolar plates and said second one of said plurality of bipolar plates.

5. A fuel cell bipolar plate, comprising:
a channel,
a manifold unconnected to said channel,
a first surface, said first surface having a flash projecting from a peripheral portion of said manifold unconnected to said channel in a direction crossing said first surface, and
a second surface, said second surface having a receding portion formed along a peripheral portion of said manifold, unconnected to said channel,
wherein a geometry of said receding portion of said second surface is capable of accommodating said flash of said first surface, and
wherein said fuel cell bipolar plate includes a conductive carbon material and a resin binder.

6. The fuel cell bipolar plate according to claim 5, wherein said receding portion forms a step.

7. A fuel cell, comprising:
a pair of fuel cell bipolar plates, as recited in claim 5; and
a membrane electrode assembly stacked alternately with said pair of fuel cell bipolar plates,
wherein a first one of said pair of fuel cell bipolar plates has said flash accommodated in said receding portion of a second one of said pair of fuel cell bipolar plates.

8. A fuel cell, comprising:
a plurality of fuel cell bipolar plates, as recited in claim 5; and
a membrane electrode assembly stacked alternately with said plurality of fuel cell bipolar plates,
wherein a first one of said plurality of fuel cell bipolar plates has said flash accommodated in said receding portion of a second one of said plurality of fuel cell bipolar plates, which is opposite to said first one of said plurality of fuel cell bipolar plates, and
wherein said membrane electrode assembly is interposed between said first one of said plurality of fuel cell bipolar plates and said second one of said plurality of fuel cell bipolar plates.

9. A fuel cell comprising:
a pair of fuel cell bipolar plates, consisting of a first fuel cell bipolar plate and a second fuel cell bipolar plate opposite to said first fuel cell bipolar plate, said first fuel cell bipolar plate having a flash-including surface having flash projecting from an outer peripheral portion of said flash-including surface in a direction crossing said flash-including surface, and said second fuel cell bipolar plate having a receding portion-including surface having a receding portion formed along an outer peripheral portion of said receding portion-including surface, and
a membrane electrode assembly stacked alternately with said pair of fuel cell bipolar plates,
wherein a geometry of said receding portion of said receding portion-including surface is capable of accommodating said flash of said flash-including surface,
wherein said pair of fuel cell bipolar plates each include a conductive carbon material and a resin binder; and
wherein said flash of said first fuel cell bipolar plate is accommodated in said receding portion of said second fuel cell bipolar plate.

* * * * *